United States Patent
Santini

(10) Patent No.: US 6,560,853 B1
(45) Date of Patent: May 13, 2003

(54) METHOD OF MAKING INDUCTIVE HEAD WITH REDUCED HEIGHT INSULATION STACK DUE TO PARTIAL COVERAGE ZERO THROAT HEIGHT DEFINING INSULATION LAYER

(75) Inventor: Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,147

(22) Filed: May 1, 2000

Related U.S. Application Data

(62) Division of application No. 09/058,675, filed on Apr. 10, 1998, now Pat. No. 6,104,576.

(51) Int. Cl.[7] .............................................. G11B 5/42
(52) U.S. Cl. ............................. 29/603.14; 29/603.15; 29/603.07; 29/603.18; 29/603.12; 29/603.01; 360/126; 360/125; 216/22
(58) Field of Search ........................ 29/603.14, 603.13, 29/603.12, 603.15, 603.07, 603.01, 603.18; 360/126, 125, 110, 117; 216/22, 47

(56) References Cited

U.S. PATENT DOCUMENTS

| | | | | |
|---|---|---|---|---|
| 4,458,279 A | | 7/1984 | Katz ........................... | 360/123 |
| 4,652,954 A | * | 3/1987 | Church ........................ | 360/120 |
| 4,685,014 A | | 8/1987 | Hanazono et al. .......... | 360/126 |
| 5,047,886 A | * | 9/1991 | Toyoda et al. .............. | 360/126 |
| 5,245,493 A | | 9/1993 | Kawabe ...................... | 360/126 |
| 5,621,596 A | * | 4/1997 | Santini ........................ | 360/126 |
| 5,793,578 A | * | 8/1998 | Heim et al. ................. | 360/126 |
| 5,798,897 A | * | 8/1998 | Chang et al. ............... | 360/126 |
| 5,802,700 A | * | 9/1998 | Chen et al. ................. | 29/603.14 |
| 5,805,391 A | * | 9/1998 | Chang et al. ............... | 360/113 |
| 5,880,915 A | * | 3/1999 | Lee et al. .................... | 360/126 |
| 5,901,431 A | * | 5/1999 | Santini ....................... | 29/603.14 |
| 6,104,576 A | * | 8/2000 | Santini ........................ | 360/126 |
| 6,337,783 B1 | * | 1/2002 | Santini ........................ | 360/317 |
| 6,434,814 B1 | * | 8/2002 | Chang et al. ............... | 29/603.14 |

FOREIGN PATENT DOCUMENTS

| | | |
|---|---|---|
| JP | 58-100212 | 12/1981 |
| JP | 58-111116 | 7/1983 |
| JP | 58-128012 | 7/1983 |
| JP | 58-128017 | 7/1983 |
| JP | 60-258716 | 12/1985 |
| JP | 63-152008 | 6/1988 |
| JP | 6-111245 | 4/1994 |

\* cited by examiner

*Primary Examiner*—Peter Vo
*Assistant Examiner*—Minh Trinh
(74) *Attorney, Agent, or Firm*—Ervin F. Johnston

(57) ABSTRACT

A method makes a magnetic head with a zero throat height (ZTH) comprising the steps of forming a first pole piece layer, forming the ZTH defining insulation layer on a first portion of the first pole piece layer, forming an insulation layer on the ZTH defining insulation layer and a first insulation layer on a second portion of the first pole piece layer, forming a coil layer on the first insulation layer so that the ZTH defining insulation layer is located entirely between the coil layer and the ABS, forming at least a second insulation layer on the coil layer, forming the second pole piece over a front portion of a top surface of the ZTH defining insulation layer and on the second insulation layer so that the ZTH defining insulation layer causes the second pole piece to separate from the first pole piece layer and forming the first insulation layer with a thickness that is less than a thickness of the ZTH defining insulation layer so that a pole tip portion of the second pole piece can be frame plated with improved side wall definition.

24 Claims, 23 Drawing Sheets

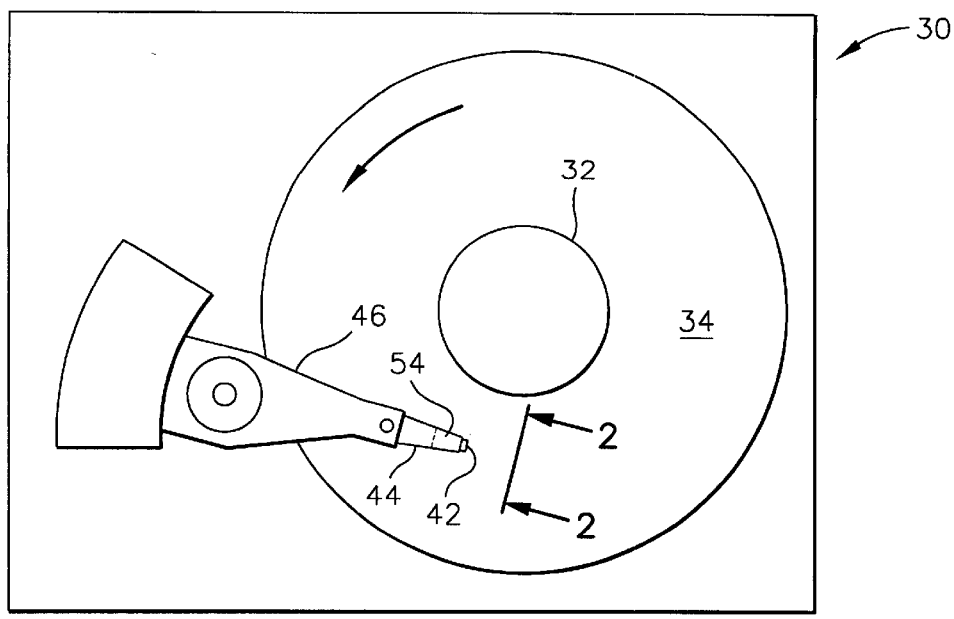
FIG. 1
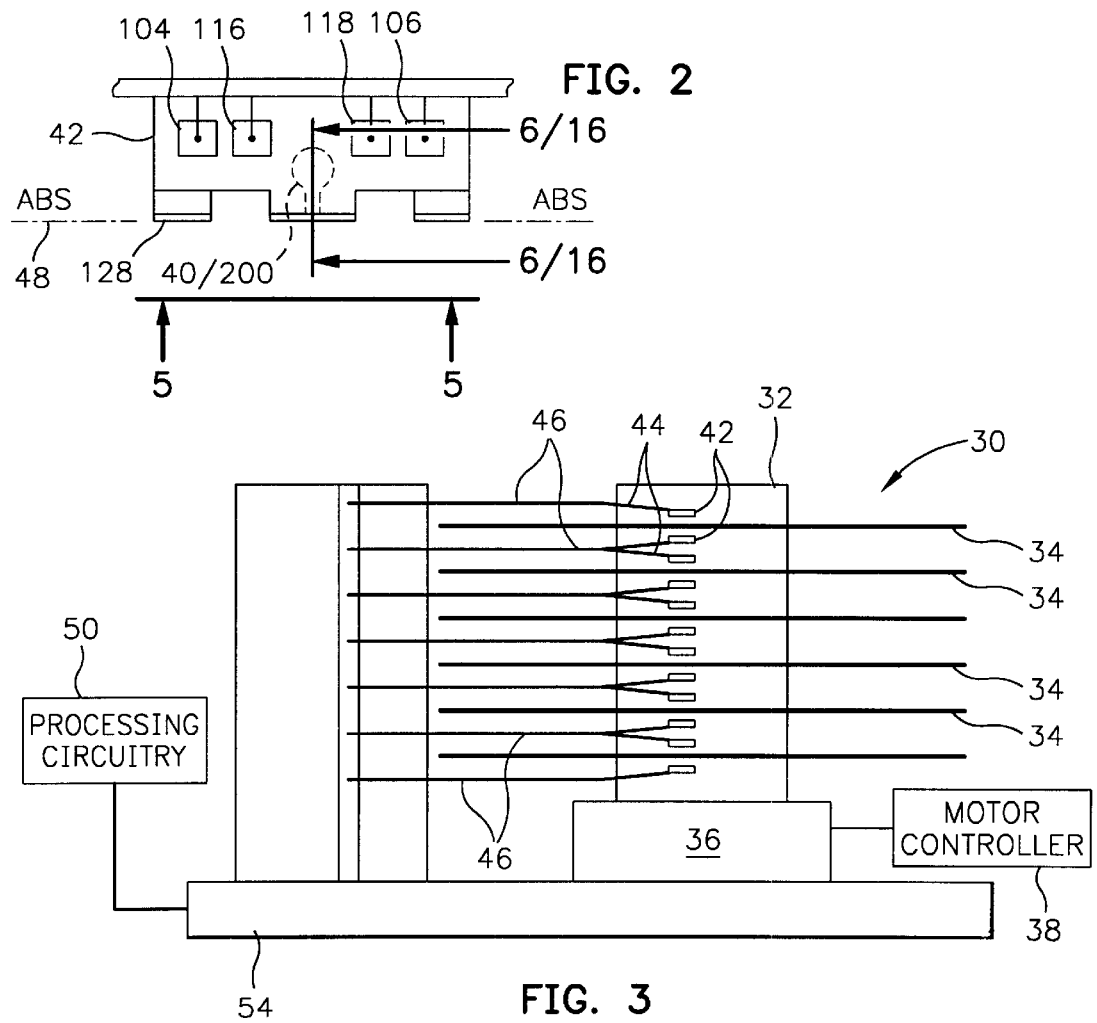
FIG. 2
FIG. 3

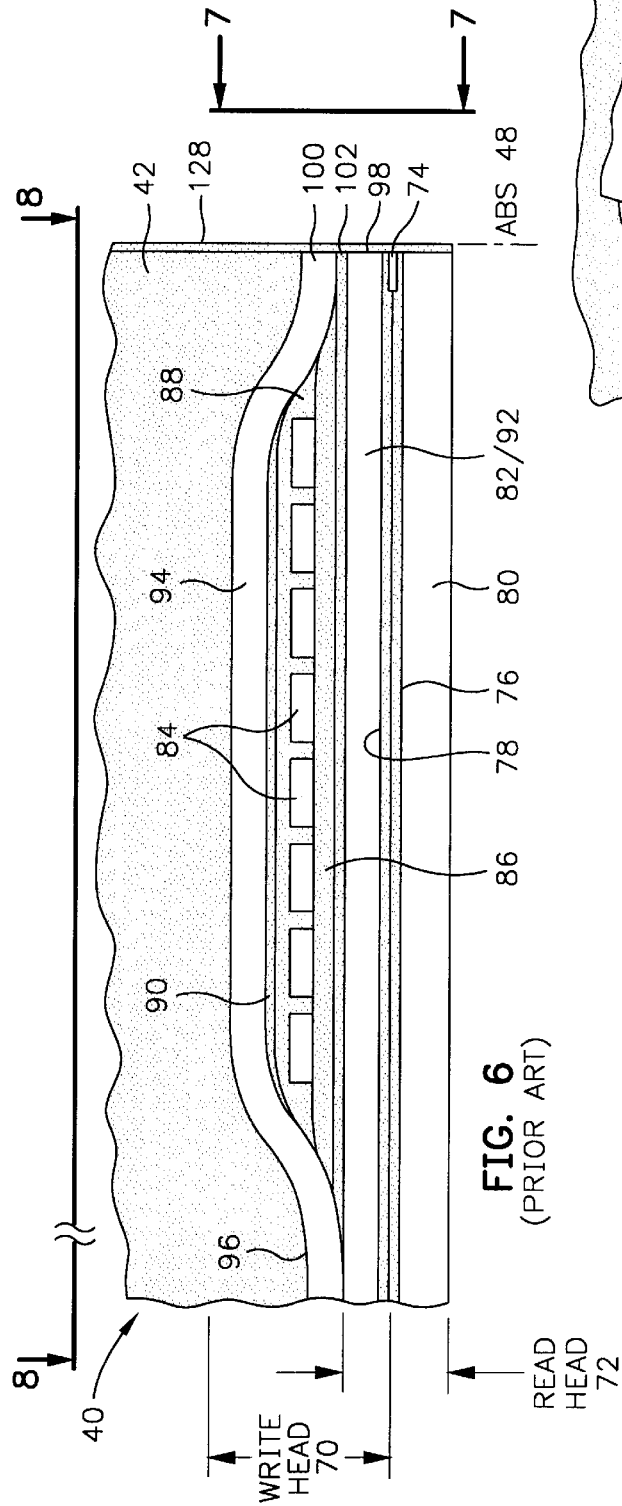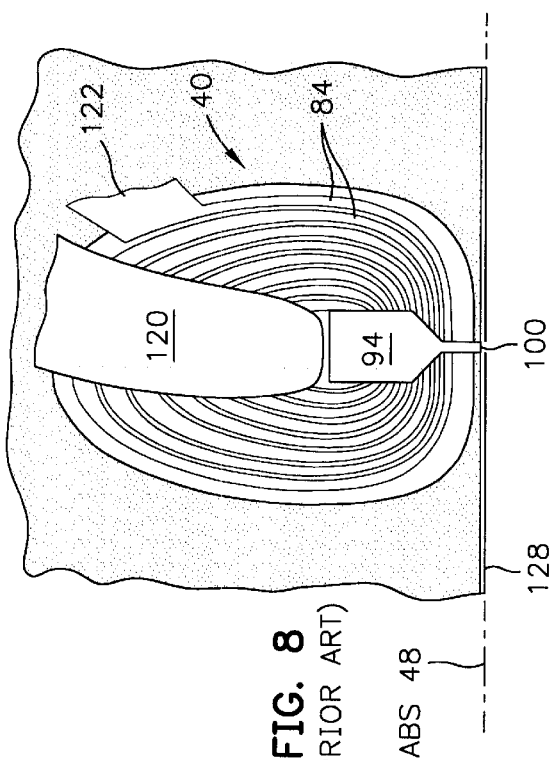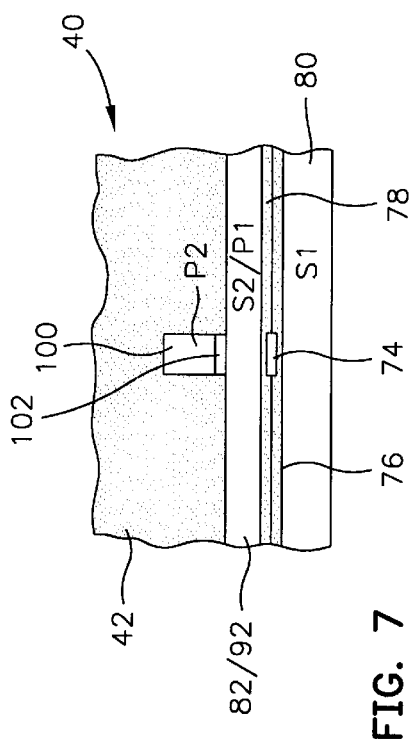
FIG. 6 (PRIOR ART)
FIG. 8 (PRIOR ART)
FIG. 7 (PRIOR ART)

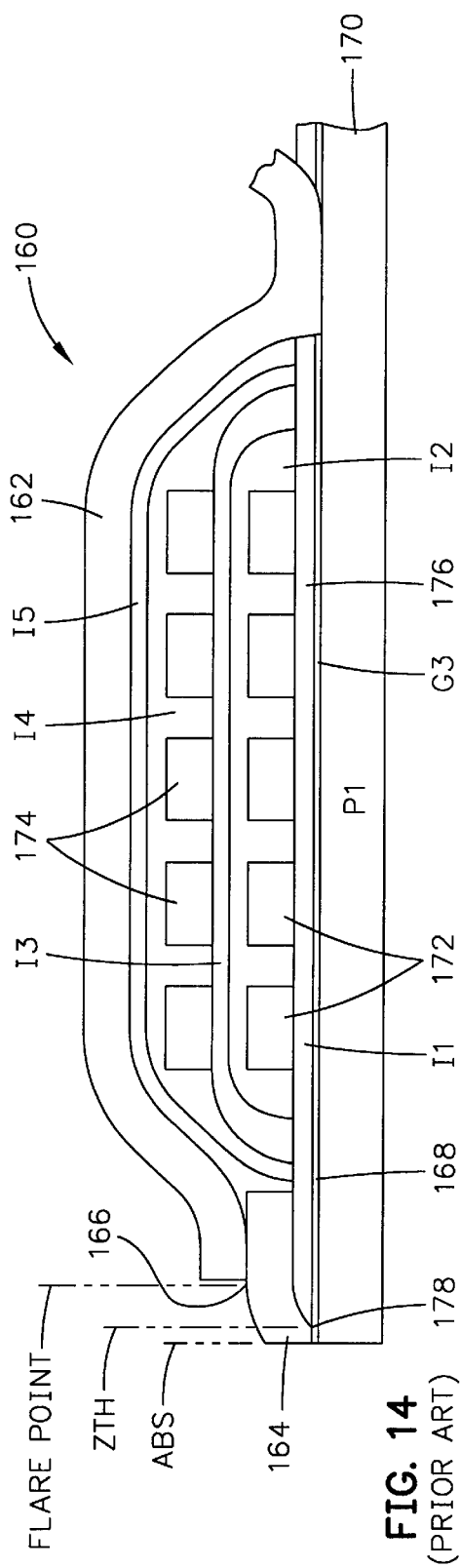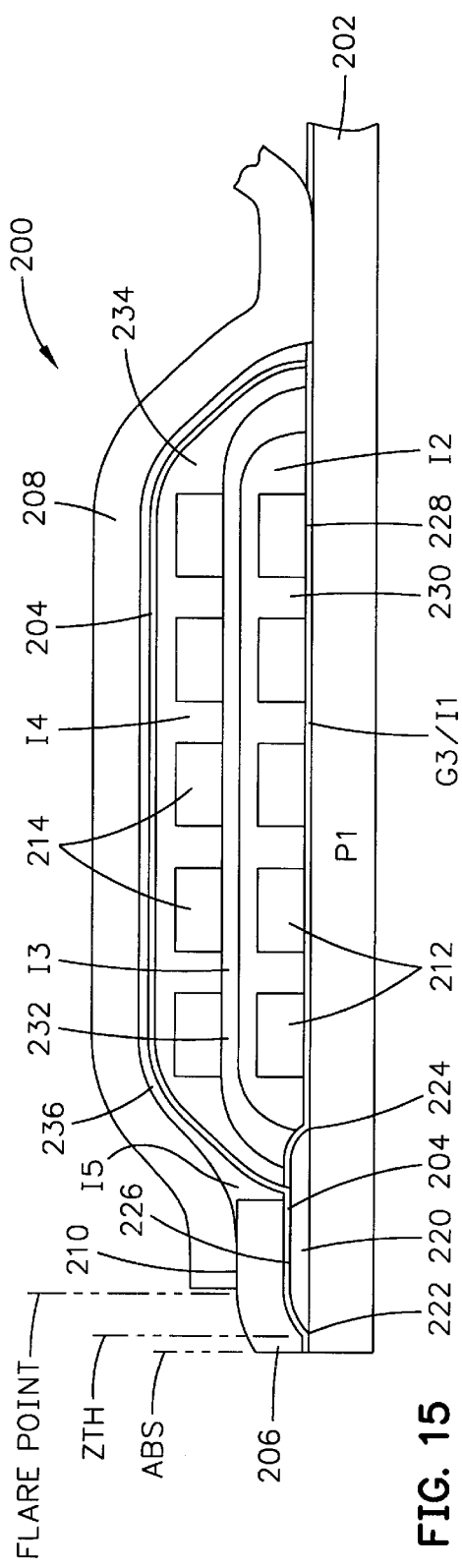

METHOD OF MAKING INDUCTIVE HEAD WITH REDUCED HEIGHT INSULATION STACK DUE TO PARTIAL COVERAGE ZERO THROAT HEIGHT DEFINING INSULATION LAYER

REFERENCE TO RELATED APPLICATION

This is a divisional application of application Ser. No. 09/058,675 filed Apr. 10, 1998 now U.S. Pat. No. 6,104,576.

BACKGROUND OF THE INVENTION

1. Field of the Invention

The present invention relates to an inductive head with an insulation stack whose height is reduced by a partial coverage zero throat height (ZTH) defining insulation layer and, more particularly, to an inductive head that has a ZTH defining insulation layer located entirely between an air bearing surface (ABS) of the head and one or more coil layers of an insulation stack, thereby permitting the insulation stack to be lowered.

2. Description of the Related Art

An inductive write head includes a coil layer embedded in first, second and third insulation layers (called "the insulation stack"), the insulation stack being located between first and second pole piece layers. A gap is formed between the first and second pole piece layers by a gap layer at an air bearing surface (ABS) of the write head. The pole piece layers are connected at a back gap. Current conducted through the coil layer produces a magnetic field in the pole pieces. The magnetic field fringes across the gap at the ABS for the purpose of writing information in tracks on moving media, such as in circular tracks on a rotating magnetic disk or longitudinal tracks on a moving magnetic tape.

The second pole piece layer has a pole tip portion which extends from the ABS to a flare point, and a yoke portion which extends from the flare point to the back gap. The flare point is where the second pole piece begins to widen (flare) to form the yoke. The placement of the flare point directly affects the magnitude of a magnetic field produced to write information on the recording medium. Since the magnitude of magnetic flux decays as it travels down the length of the narrow second pole tip, shortening the second pole tip will increase the magnitude of the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in over-writing of adjacent tracks. A well-defined second pole tip should have parallel planar side walls which are perpendicular to the ABS. This definition is difficult to achieve because the second pole tip is typically formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining insulation layer rises from a plane normal to the ABS at an angle (apex angle) to the plane. After hard baking of the insulation layers and deposition of a metallic seedlayer, the sloping surfaces of the insulation layers exhibit a high optical reflectivity. When the second pole tip and yoke are constructed, a thick layer of photoresist is spun on top of the insulation layers and photo patterned to shape the second pole tip, using a conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when the ultraviolet light strikes the sloping surfaces of the insulation layers in a flaring region of the second pole piece, it is reflected forward, toward the ABS, into photoresist areas at the sides of the second pole tip region. After development, the side walls of the photoresist extend outwardly from the intended ultraviolet pattern, causing the pole tip plated therein to be poorly formed. This is called "reflective notching". As stated hereinabove this can lead to overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the magnitude of flux reaching the recording medium.

The high profile of the insulation stack causes another problem after the photoresist is spun on a wafer. When the photoresist is spun on a wafer, it is substantially planarized across the wafer. The thickness of the photoresist in the second pole tip region is higher than other regions of the head since the second pole tip is substantially lower on the wafer than the yoke portion of the second pole piece. During the light exposure step the light progressively scatters in the deep photoresist like light in a body of water, causing poor resolution during the light exposure step.

Although an insulation stack with a double coil is higher than an insulation stack with a single coil, a double coil head is desirable because two smaller diameter coils can produce the same flux density as a single coil, with less reluctance. Less reluctance permits a faster rise time of the signal which results in a faster data rate. There is a need for a double coil head wherein the height of the insulation stack can be reduced so as to improve the construction of a photoresist frame for plating the second pole tip.

Still another problem is that, if the ZTH defining layer of the insulation stack is not an insulation layer above the last coil, the ZTH will be altered by subsequent processing steps. A seedlayer, employed for plating the coil, is removed from all locations except under the coil by milling with an ion beam. The milling strikes all surfaces on a wafer where rows and columns of magnetic heads are constructed. If for instance, the ZTH defining layer is the first insulation layer of the insulation stack, removal of the seed layer will also remove part of the ZTH defining insulation layer. This will cause a recession of the original location of the ZTH defining insulation layer, which alters the design of the head.

SUMMARY OF THE INVENTION

The present invention does not employ any insulation layers of the insulation stack for defining the ZTH of the head. Instead a ZTH defining insulation layer is employed that is located entirely between the ABS and the one or more coil layers. The ZTH defining insulation layer is formed directly on the first pole piece, and has front and rear ends with a substantially flat top surface therebetween. The front end of the ZTH defining insulation layer causes the first and second pole pieces to first separate after the ABS, thereby defining the ZTH of the head. The first or only coil of the head is separated from the first pole piece by a thin layer of alumina which is the first insulation layer of the insulation stack. The first insulation layer is thinner than the ZTH defining layer so that the first or only coil layer is now lower than prior art coil layers. A bottom surface of the first or only coil layer is recessed below the top surface of the ZTH defining insulation layer. This makes the construction of a double coil head more desirable since the lower first coil will reduce the height of the stack. The double coil can be employed for increasing the data rate of the head, while the lower stack height will permit improved resolution of the second pole tip. When the photoresist is spun on the partially completed head the photoresist layer will be thinner in the pole tip region, reducing the scattering of light during an exposure step.

In a stitched head, with either a single or a double coil, reflective notching can be obviated, and resolution of the second pole tip can be improved. A stitched head is one in which the second pole piece has two components that are constructed separately. A second pole tip, located entirely between the ABS and the first or only coil layer, is constructed first, followed by a yoke portion that is connected (stitched) to a top surface of the second pole tip. The second pole tip is constructed on the ZTH defining insulation layer and has a back end that is forward of the rear end of the ZTH defining insulation layer. By locating a flare point of the second pole tip on the flat top surface of the ZTH defining insulation layer, all light in the light exposure step is reflected straight up instead of into photoresist regions adjacent a site for the second pole tip. Accordingly, there is no reflective notching. When the yoke portion of the second pole piece is constructed, reflective notching may occur, but this is unimportant since the second pole tip is already constructed. It should be noted that the height of the insulation stack in either the single or double coil stitched head will be reduced. This means that when the photoresist is spun on the head, it will be thinner in the pole tip region, permitting better resolution of the side walls of the photoresist frame for the second pole tip.

In a head including a single layer second pole piece with a single or double coil, reflective notching will be reduced by the present invention. In this case, the flare point is located in a flat section of the top surface of the ZTH defining insulation layer; as a result the second pole piece is flat from the flare point until it is forced to rise due to the insulation stack. Where the second pole piece is flat on the ZTH defining insulation layer, light will be directed upward during the light exposure step instead of into side regions of the photoresist frame where the pole tip is to be formed. Light is reflected from the insulation stack, far from the pole tip region, thereby reducing reflective notching. Further, the height of the insulation stack for either a single coil or a double coil will be reduced, thereby reducing the thickness of photoresist in the pole tip region. As stated hereinabove, this improves the resolution of the side walls and the bottom critical dimension of the second pole tip.

The invention also has other advantages. The gap layer can be employed both to form the gap layer between the pole tips, and to serve as the first insulation layer between the first or only coil and the first pole piece layer. Alternatively, an alumina layer may be formed on the ZTH defining insulation layer to serve as the first insulation layer for the insulation stack. After constructing the one or more coil layers, a portion of the alumina layer covering the ZTH defining insulation layer can be removed and a gap layer may be deposited. The second pole piece is then constructed on the gap layer. The advantage of this latter scheme is that the gap layer is not damaged when an ion beam is employed to remove one or more seed layers employed in the construction of the one or more coil layers. When a single alumina layer serves as both gap and first insulation layer, the layer must be provided with extra thickness in order to maintain a required gap thickness after process variations. In both schemes, however, the ZTH defining insulation layer is protected by a covering (an extra thick gap layer, or a removable alumina layer) so that the ZTH location is not altered by subsequent processing steps, such as removal of a coil seed layer by ion milling.

Another advantage of the invention is that the ZTH defining insulation layer can be extended by an appropriate photoresist frame to be located along the side edges of the first pole piece layer so as to minimize the height of the step from the top of the first pole piece layer to a second read gap layer. This improves planarity of a photoresist frame for the construction of the first coil layer. This planarity reduces or eliminates reflective notching of the coil frame so that when the coil is plated it will have well-defined side walls.

An object of the present invention is to provide an inductive write head with an insulation stack that has a reduced height.

Another object is to provide an inductive write head that has a second pole tip with improved definition.

A further object is to provide an inductive write head in which the zero throat height is not defined by any insulation layer of the coil insulation stack.

Still another object is to provide either a single or double coil stitched inductive write head with no reflective notching, and with improved resolution of the side walls of the second pole tip.

Still a further object it to provide either a single or double coil layer second pole piece inductive write head in which reflective notching is reduced and resolution of the side walls of the second pole tip is improved.

Still another object is to provide a method of making an inductive write head with an insulation stack that has a reduced height and, consequently, improved resolution of the side walls of the second pole tip.

Still a further object is to provide a method of making an inductive write head wherein, once a ZTH defining insulation layer is formed, the location of the ZTH is not altered by subsequent processing steps.

Other objects and advantages of the present invention will become apparent upon reading the following detailed description taken together with the accompanying drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 6 is a partial view of the slider and a prior art magnetic head as seen in plane 6—6 of FIG. 2;

FIG. 7 is a partial ABS view of the slider taken along plane 7—7 of FIG. 6 to show the read and write elements of the prior art magnetic head;

FIG. 8 is a view taken along plane 8—8 of FIG. 6 with all material above the second pole piece removed;

FIG. 14 is a longitudinal cross-sectional view of a prior art stitched double coil head;

FIG. 15 is a longitudinal cross-sectional view of a stitched double coil head employing the present invention;

DESCRIPTION OF THE PREFERRED EMBODIMENTS

Magnetic Disk Drive

Figure 4:
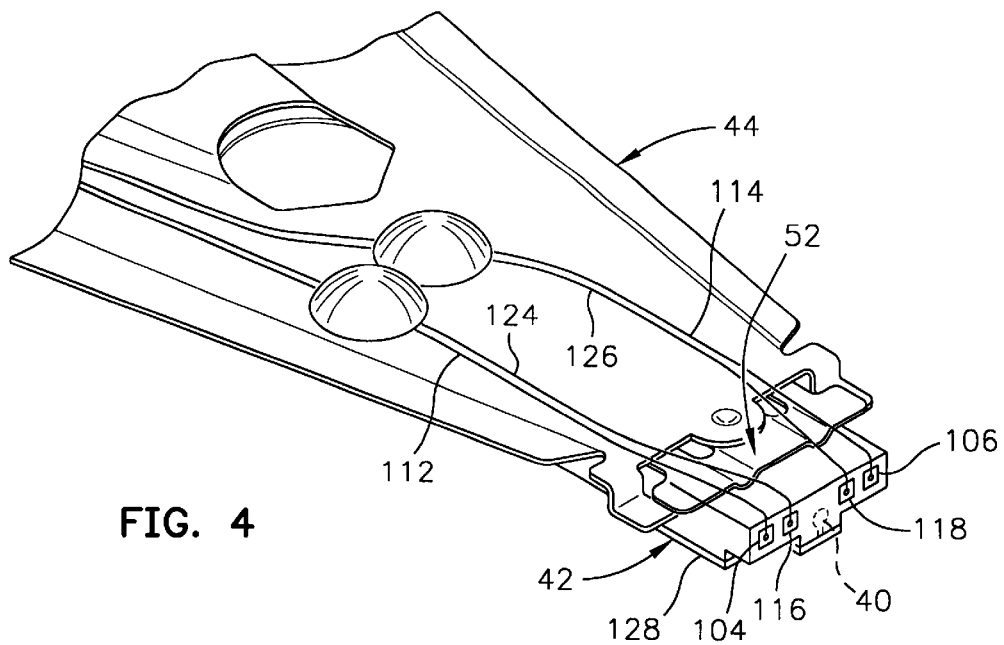
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
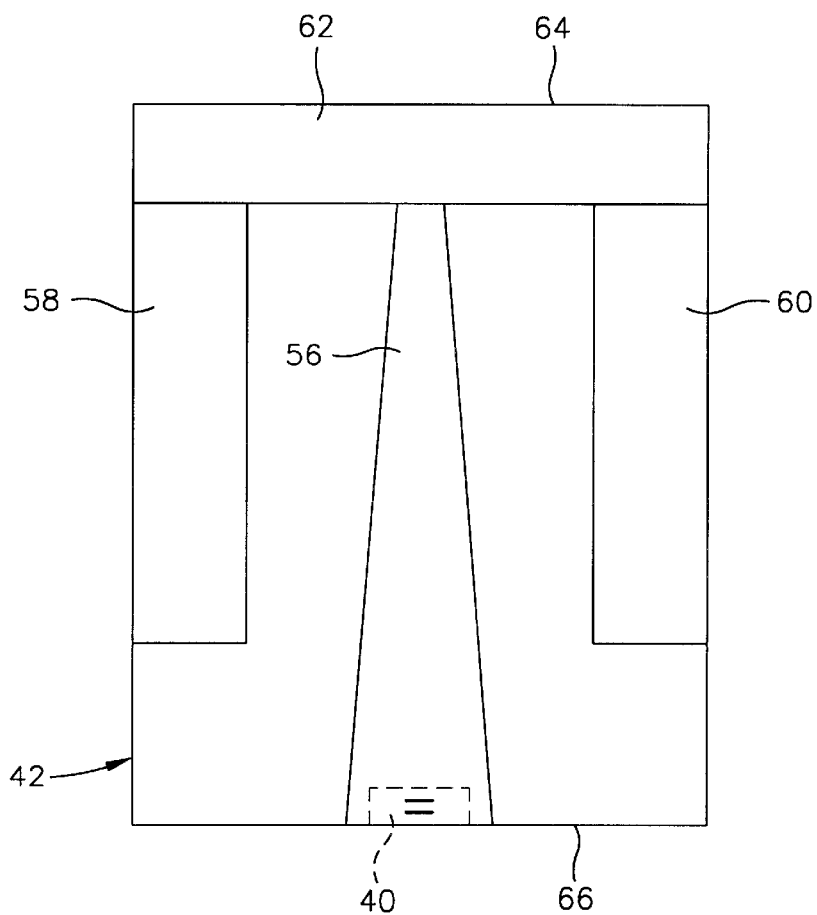
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Figure 9:
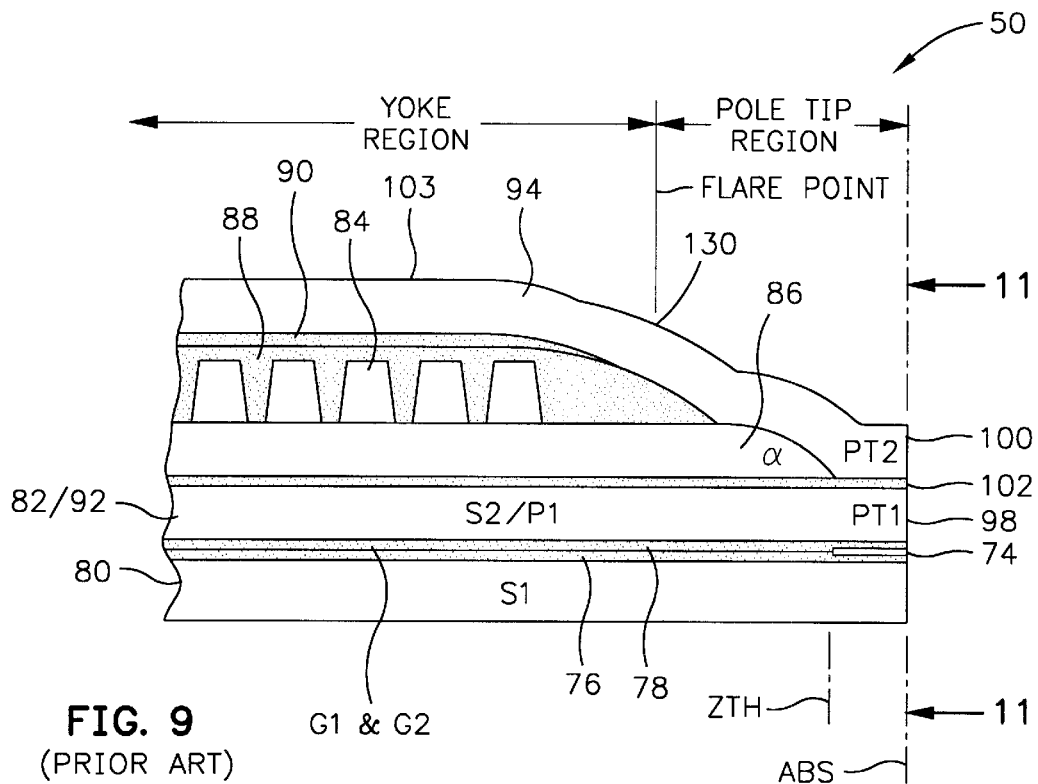
FIG. 9 is an enlarged front portion of the prior art magnetic head of FIG. 6 to show various details thereof.
Figure 12:
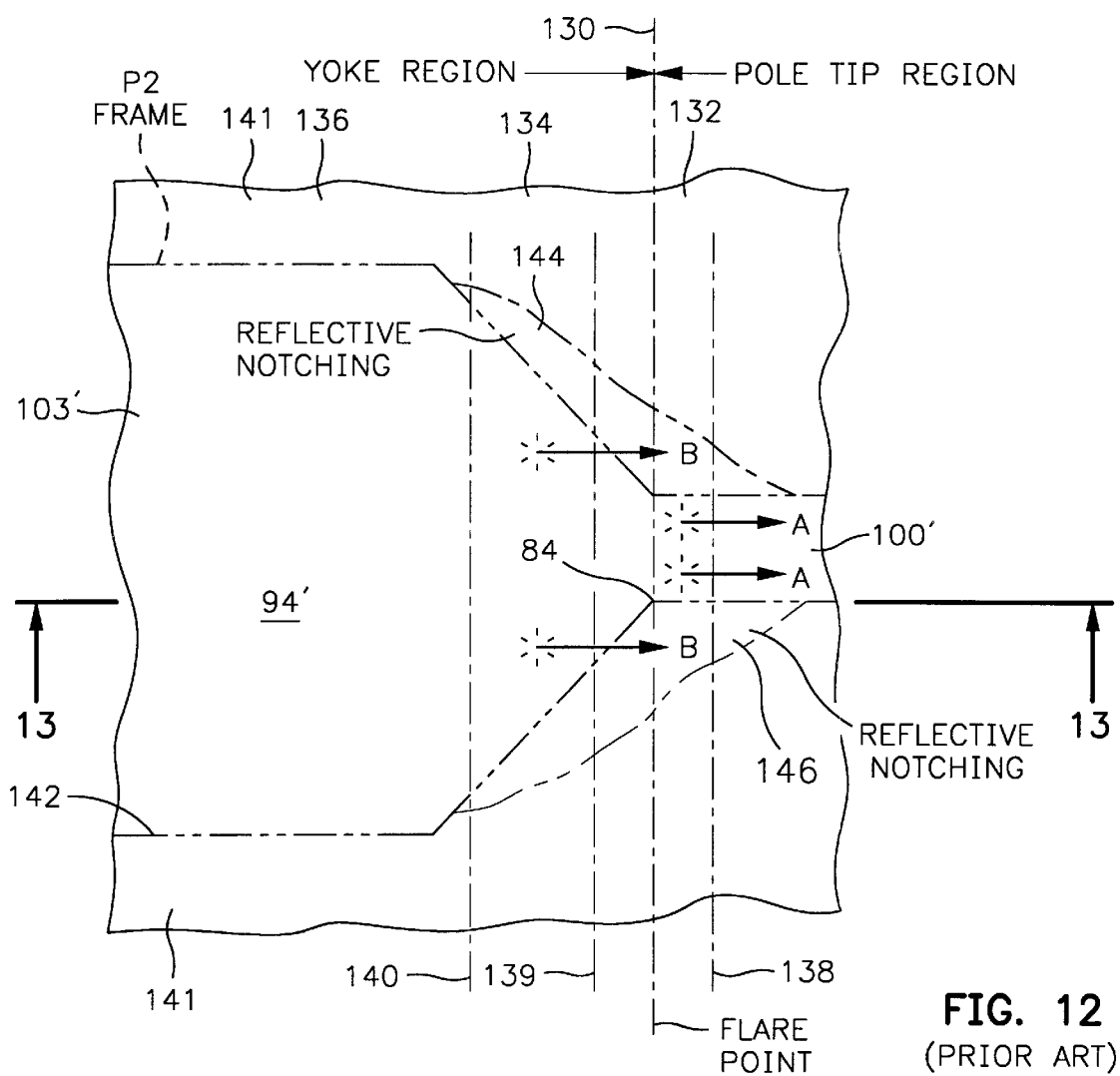
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photo-resist mask (P2 frame).

Figure 13:
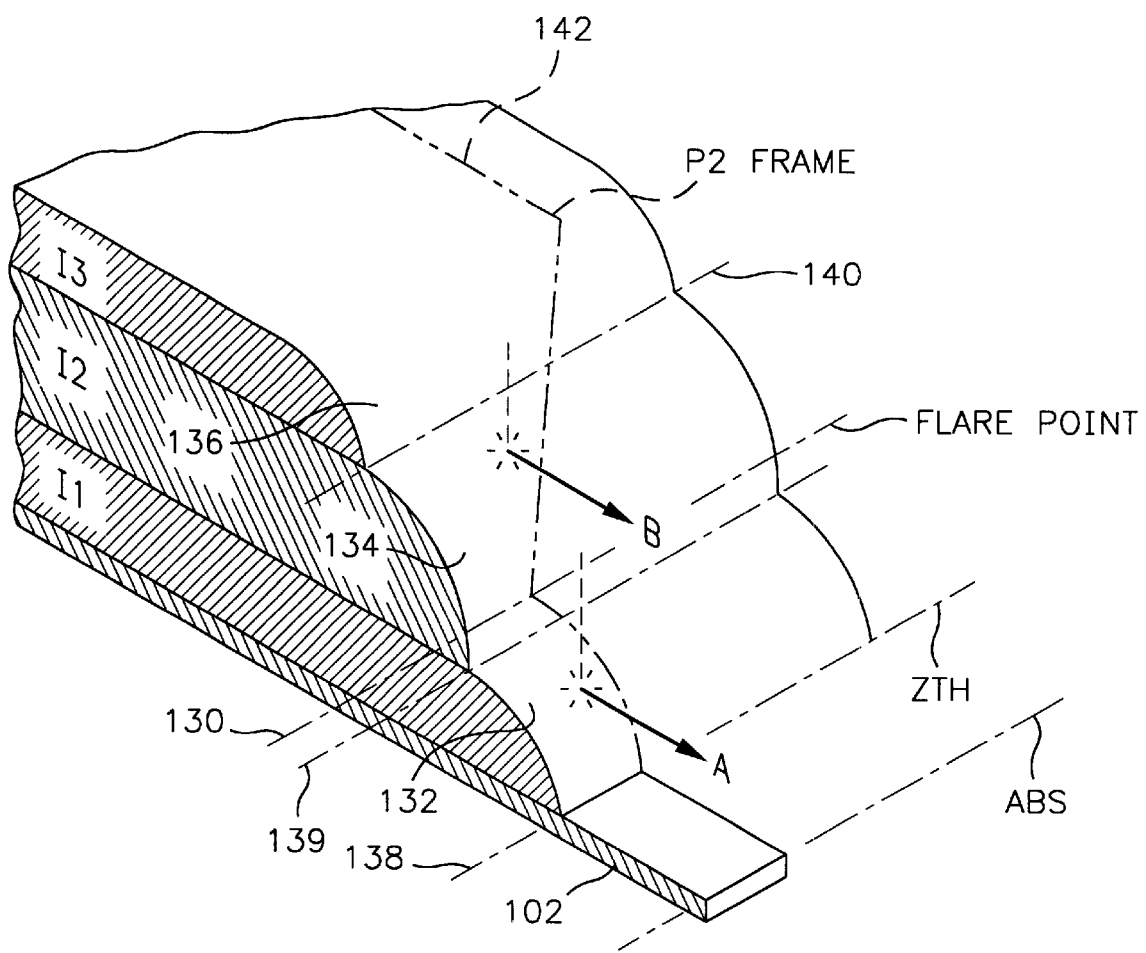
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 μm because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 μm) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
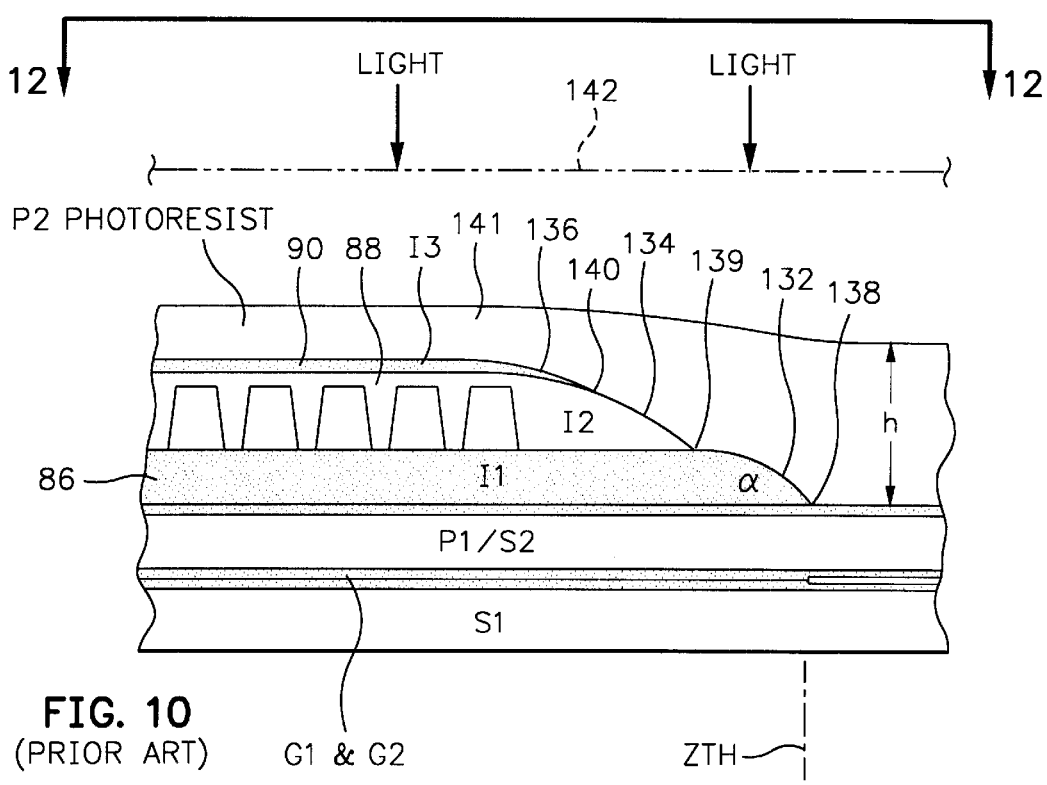
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. When a seedlayer, which is NiFe, is deposited on these surfaces for construction of the second pole piece these surfaces become highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 μm thick in the pole tip region and is typically approximately 4.5 μm thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
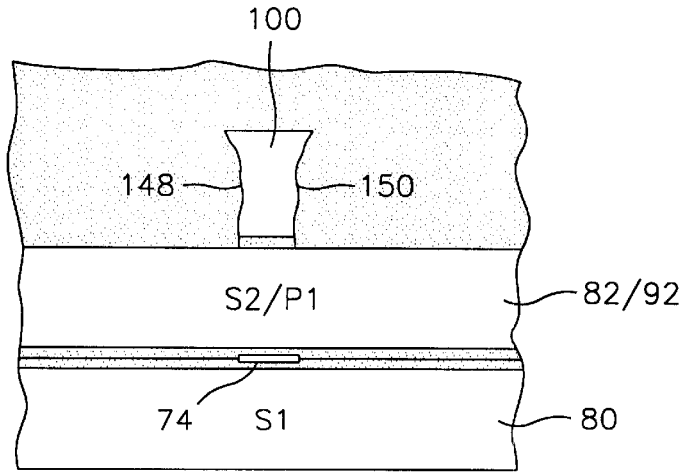
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed PI notched write head structure due to incomplete notching of the first pole piece 72. These poorly formed pole tips result in side writing of adjacent tracks.

FIG. 14 shows a prior art stitched double coil head 160 which has a second pole piece yoke layer 162 stitched to a second pole piece pole tip 164 at 166. A write gap layer 168 separates the second piece pole tip 164 from a first pole piece layer 170 and may extend back into the head under first and second coils 172 and 174. On top of the write gap layer is a first insulation layer 176 of the insulation stack which has a forward end 178 which defines the zero throat height (ZTH) of the head by causing the first and second pole pieces to first separate after the ABS. While the use of a double coil decreases the overall diameter of each of the coils for increasing the data rate of the head, the double coil has the disadvantage of presenting a higher insulation stack comprising I1, I2, I3, I4, I5 and the coils. The insulation stack increases the thickness of the photoresist in the area of the pole tip region where the second pole piece pole tip 164 is to be constructed. This extra thick photoresist will cause additional scattering of light during the light exposure step which will degrade resolution of the side walls of the second pole piece pole tip 164 when it is plated in the photoresist frame. It would be desirable if the insulation stack could be lowered so as to improve the construction of the second pole piece pole tip 164.

The Invention

FIG. 15 shows a stitched double coil head 200 which employs the present invention for lowering the insulation stack and accurately defining the ZTH. At the left side of the figure there is shown the ABS, the ZTH and the flare point. As stated hereinabove, the ZTH is where the first and second pole pieces first commence to separate after the ABS and the flare point is where the second pole piece commences to widen after the ABS. The head has a first pole piece layer 202 which has a top flat surface, a gap layer 204 which separates the first pole piece layer from the second pole piece pole tip layer 206 at the ABS and a second pole piece yoke layer 208 which is stitched to the second pole piece pole tip layer 206 at 210. First and second coil layers 212 and 214 are embedded in a plurality of insulation layers which collectively define the insulation stack of the head.

Figure 16:
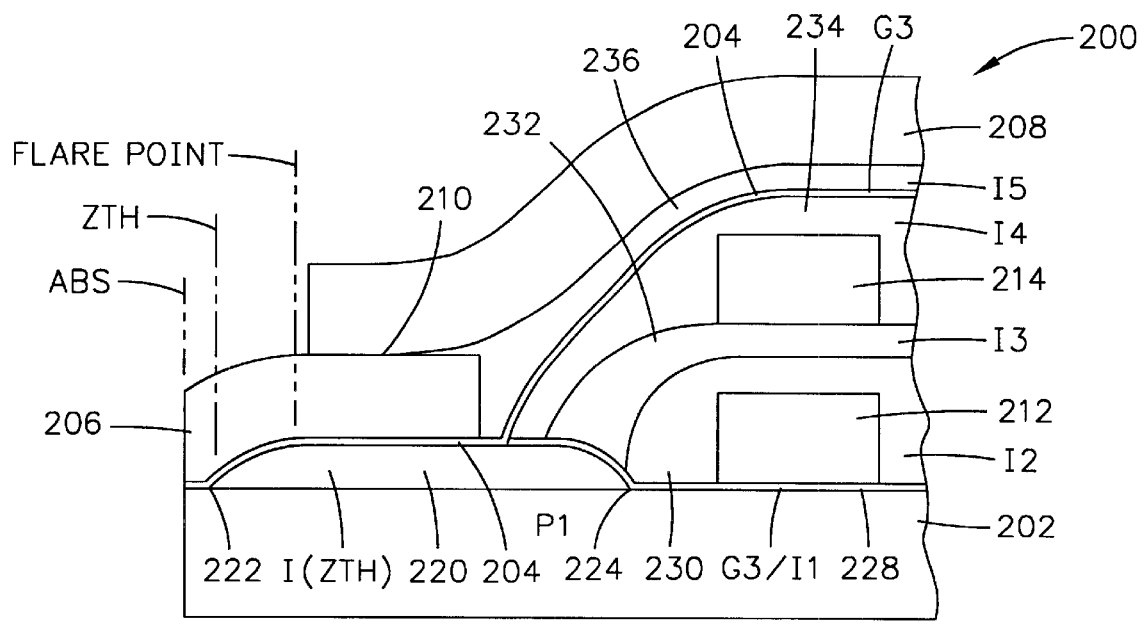
FIG. 16 is an enlarged front portion of FIG. 15 showing one embodiment regarding the gap layer.
Figure 17:
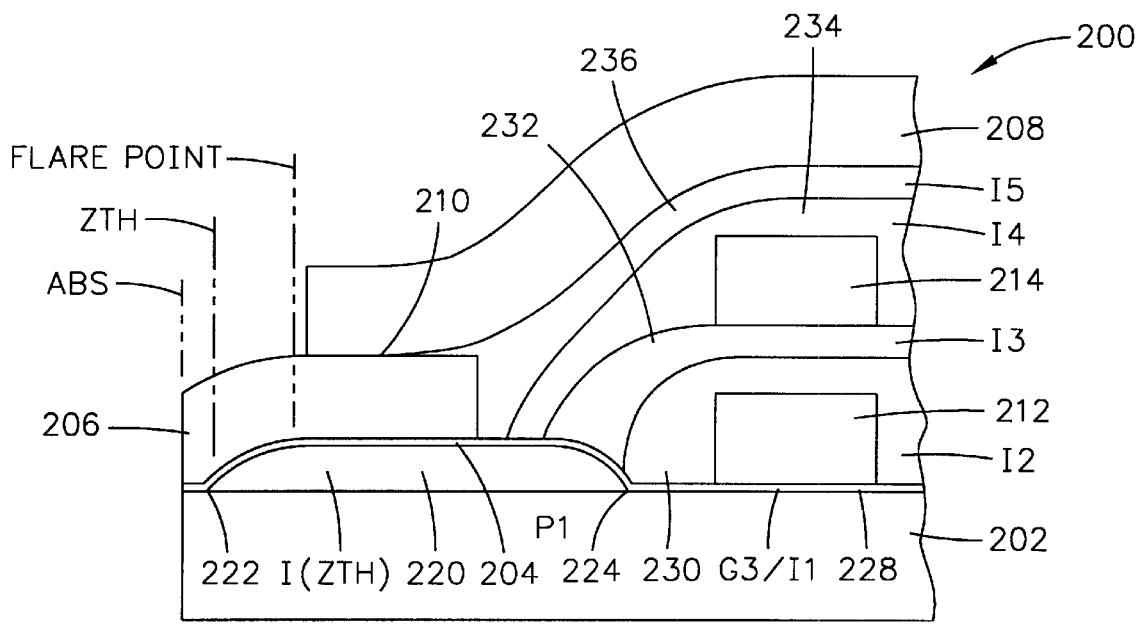
FIG. 17 is an enlarged front portion of the head, similar to FIG. 16, showing another embodiment regarding the gap layer.

The present invention employs a zero throat height (ZTH) defining insulation layer 220 which is located entirely between the ABS and the first coil layer 212. The ZTH defining insulation layer, which is preferably baked photoresist, has forward and rearward rounded ends 222 and 224 with a substantially flat top surface 226 therebetween. The forward end 222 defines the zero throat height (ZTH) of the head where the first and second pole pieces first commence to separate after the ABS. This is an important location which should not be changed by subsequent steps in the construction of the head. The ZTH significantly reduces flux leakage between the first and second pole pieces which is further decreased when the pole pieces are separated by the insulation stack. The first insulation layer (I1) is a thin alumina layer which extends partially over the ZTH defining insulation layer 220, as shown in FIGS. 15 and 16, or completely thereover, which is shown in FIG. 17. The coil layer 212 is directly on the first insulation layer 228 and a second insulation layer (I2) 230 is on the first coil layer. A third insulation layer (I3) 232 may be on the second insulation layer for planarization purposes. The second coil layer 214 is on the third insulation layer and a fourth insulation layer (I4) 234 covers the second coil layer 214. The second pole piece pole tip 206 is constructed after the formation of the fourth insulation (I4) layer 234. A fifth insulation layer (I5) 236 is then formed on top of the fourth insulation layer and partially covers a rear portion of the second pole piece pole tip layer 206. The second pole piece yoke layer 208 is on top of the fifth insulation layer 236 and is stitched to the second pole piece pole tip 206 at 210. It is important that the ZTH defining insulation layer 220 have a thickness that is greater than the thickness of the first insulation layer 228 so that a bottom surface of the first coil layer 212 is below the top surface 226 of the ZTH defining insulation layer for lowering the insulation stack. In a preferred embodiment, the thickness of the ZTH defining insulation layer 220 is 1.5 $\mu$m and the thickness of the first insulation layer 228 is 2,000–3000 angstroms. By lowering the insulation stack of the head in FIG. 15, the second pole piece pole tip 206 can be constructed in a higher resolution frame plating step. It should be noted that the third and fifth insulation layers could be omitted in the head in FIG. 15 in which case the fourth insulation layer would partially cover the rear portion of the second pole piece pole tip 206.

Figure 18:
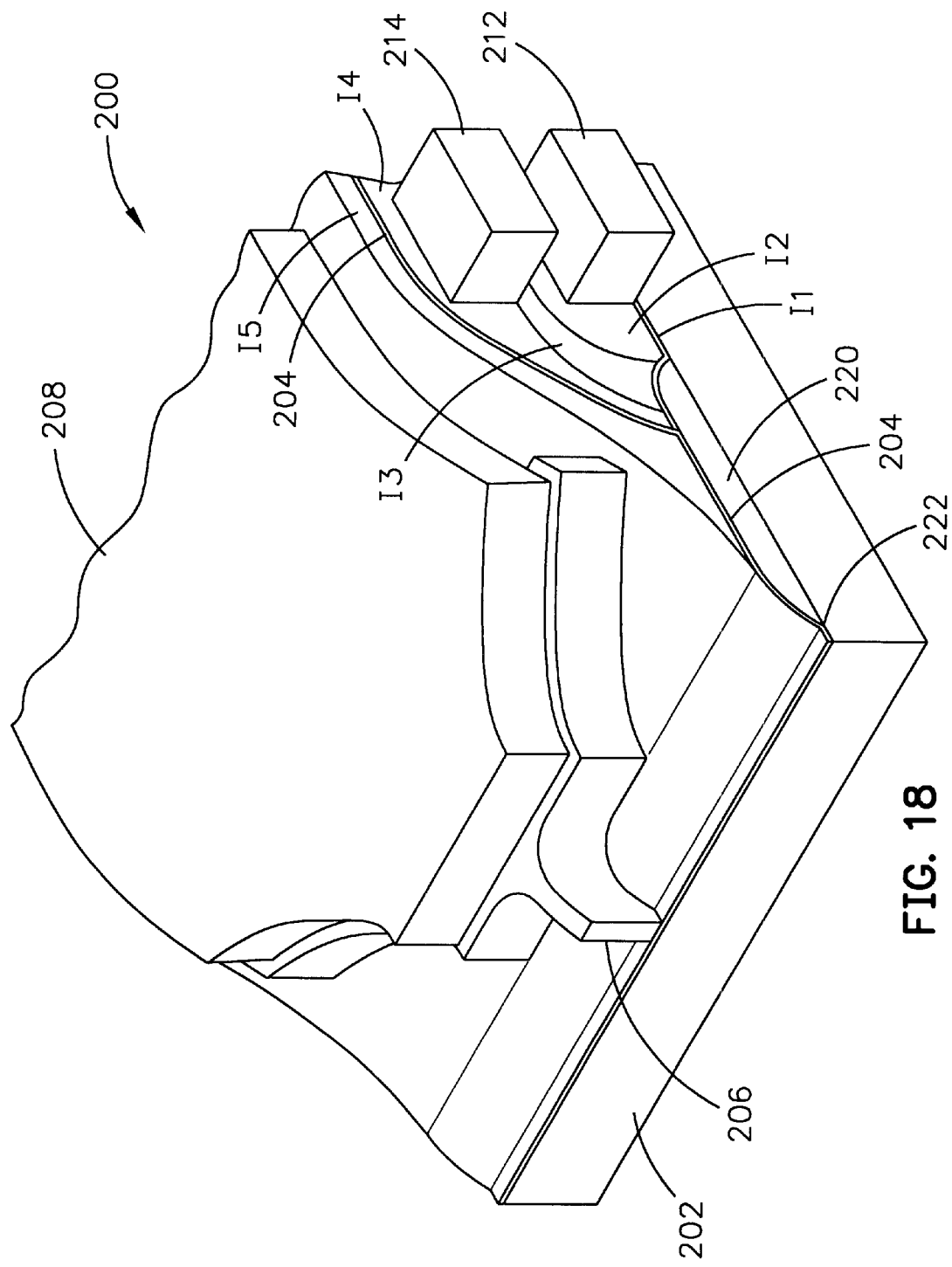
FIG. 18 is an isometric illustration of the head shown in FIG. 15.

FIGS. 16 and 18 show a preferred embodiment of the gap layer (G3) 204 for the head in FIG. 15. As shown in FIG. 16, the gap layer 204 extends from the ABS over a front portion of the ZTH defining insulation layer 220, thence over the fourth insulation layer 234. The gap layer 204 is formed after the formation of the fourth insulation layer 234 and after the removal by ion milling of seedlayers in the construction of the first and second coil layers 212 and 214. Accordingly, the gap layer 204 at and behind the ABS has not been thinned by the ion milling steps in the removal of seedlayers. This is important to ensure that the gap layer is at the proper thickness for implementing a desired linear density of the bits written by the head on the recording media. Further, the ZTH defining insulation layer 220 is protected by an extension of the first insulation layer 228 over the ZTH defining insulation layer 220 during construction of the head so that the first end 222, where the zero throat height is to be located, is protected from process variations. After construction of the fourth insulation layer, the protective extension of the first insulation layer 228 forward of 14 is removed so that the final gap layer 204 can be constructed without any process variations. This method is described in more detail hereinafter.

In FIG. 17 the gap layer 204 and the first insulation layer 228 are a common layer which is formed by sputter deposition of alumina. The common layer, which comprises layers 204 and 228, is provided with an extra thickness so as to allow for process variations so that the final thickness of the gap layer 204 is closer to the final desired thickness. The advantage of this embodiment is that two steps are eliminated, namely removal of a portion of the layer on the ZTH defining insulation layer and the deposition of the final gap layer. The disadvantage is that it is difficult to control the process variations for accurately defining the final thickness of the gap layer 204. For this reason, the embodiment shown in FIG. 16 is preferred.

Figure 19:
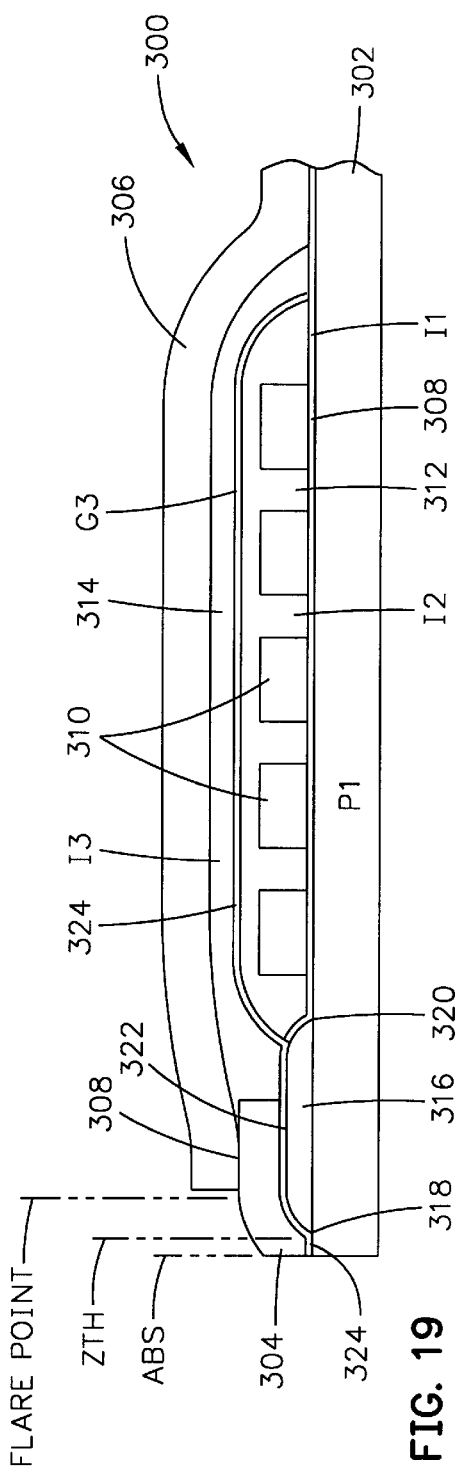
FIG. 19 is a longitudinal cross-sectional view of a stitched single coil head employing the present invention.
Figure 20:
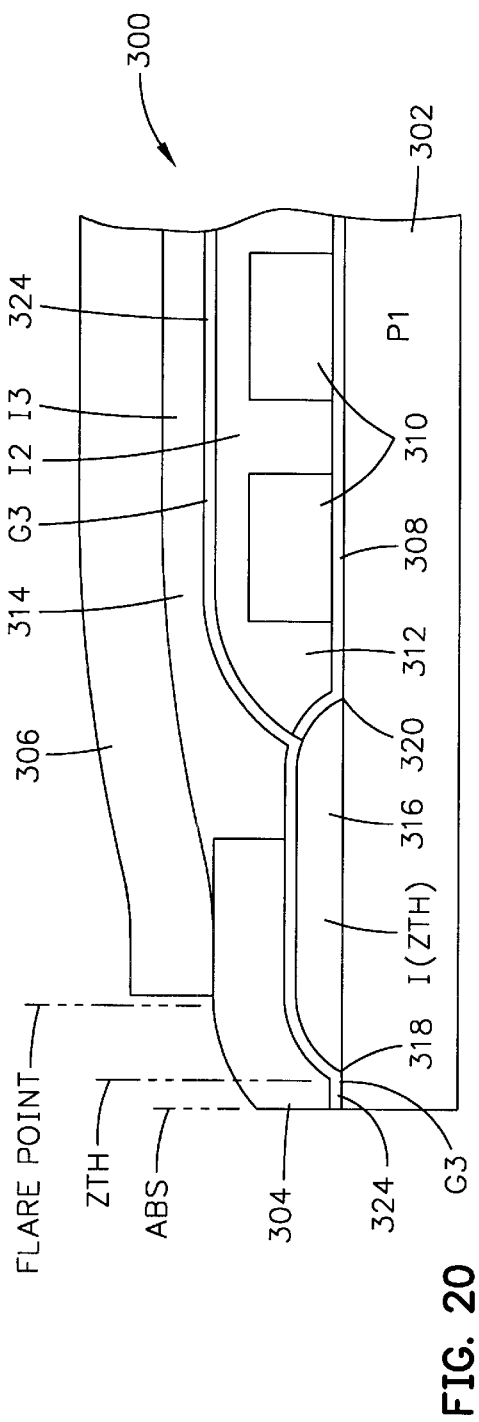
FIG. 20 is an enlarged front portion of FIG. 19 showing one embodiment regarding the gap layer.
Figure 22:
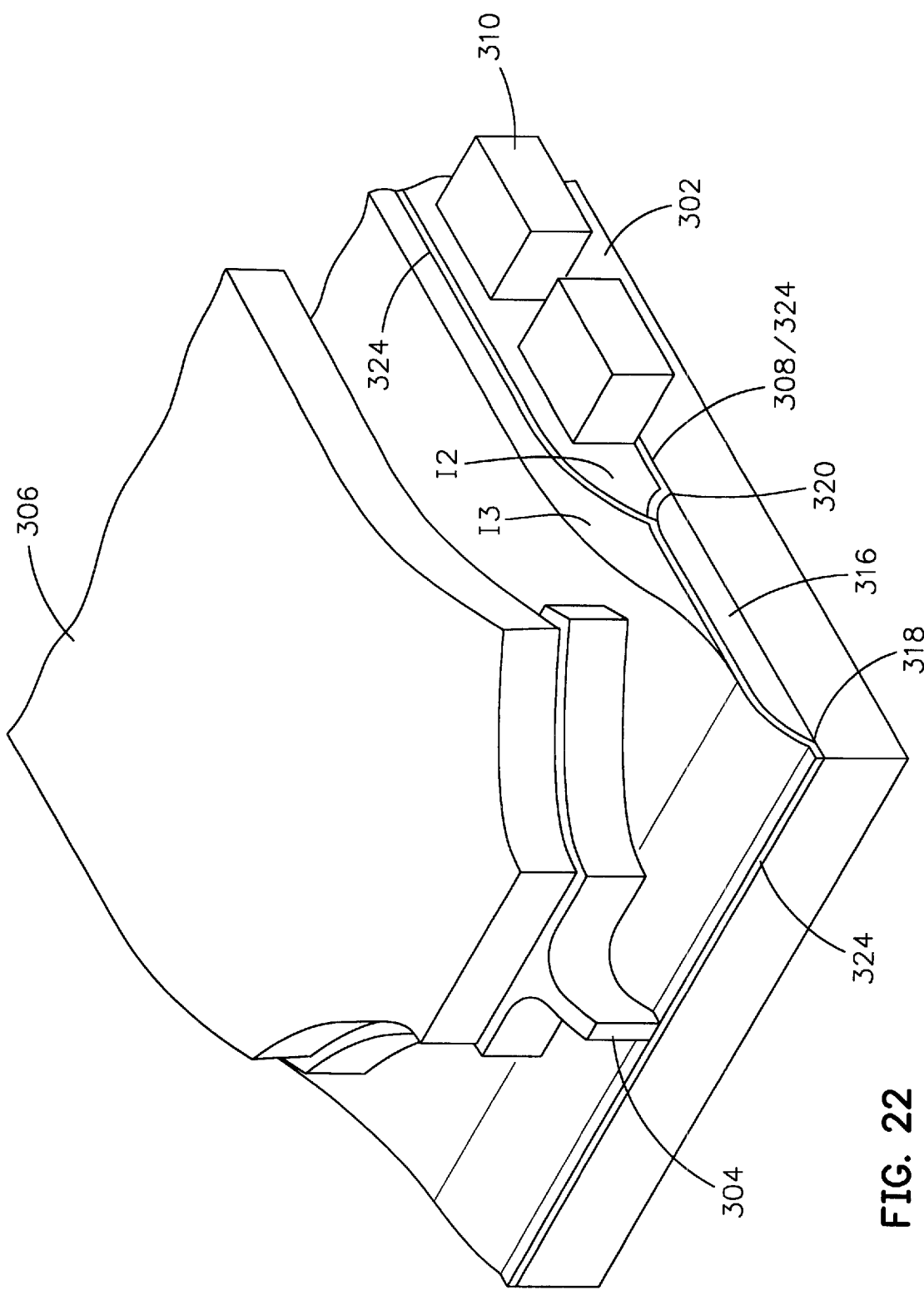
FIG. 22 is an isometric illustration of the head shown in FIG. 19.

FIGS. 19, 20 and 22 show a stitched single coil inductive write head 300 which has a first pole piece layer 302, a second pole piece pole tip layer 304 and a second pole piece yoke layer 306 which is connected to the second pole piece pole tip layer 304 in a stitched region 308. The head 300 has an ABS, a ZTH and a flare point, as shown. The first pole piece layer 302 and the second pole piece yoke layer 306 are separated by an insulation stack which includes a first insulation layer (I1) 308, a coil layer 310, which is on the first insulation layer 308, a second insulation layer (I2) 312 on the coil layer 310 and, optionally, a third insulation layer (I3) 314 on the second insulation layer. Either the second insulation layer 312 or the third insulation layer 314 may cover a rear portion of the top surface of the second pole piece pole tip 304, as shown. A ZTH defining insulation layer 316 is located entirely between the ABS and the coil layer 310. The ZTH defining insulation layer has forward and rear ends 318 and 320 with a substantially flat top surface 322 therebetween. The second pole piece pole tip layer 304 extends onto the top flat surface 322 of the ZTH defining insulation layer with the first end 318 of the ZTH defining insulation layer defining the zero throat height of the head and the flare point, where the layer 304 first commences to widen, being located substantially on the flat top surface 322.

The ZTH defining insulation layer 316 is thicker than the first insulation layer (I1) 308 so that the bottom surface of the coil 310 is below the top surface 322 of the ZTH defining insulation layer. This lowers the height of the insulation stack and enables the second pole piece yoke layer 306 to have improved planarity. Because of the significantly lowered height of the insulation stack, the construction of the second pole tip pole tip layer 304 is improved due to the fact that the photoresist for constructing the second pole tip 304 will be thinner in the pole tip region where the light step occurs. A gap layer 324 separates the first and second pole pieces at the ABS and an extension of the first insulation layer 308 covers a front portion of the ZTH defining insulation layer.

FIG. 20 shows an enlarged front portion of the head in FIG. 19. In this embodiment the gap layer 324 extends from the ABS over the top surface of the ZTH defining insulation layer 316 and thence over the second insulation layer 312. In this embodiment the gap layer is not subjected to processing steps and is formed just prior to forming the second pole piece pole tip layer 304 thereon. As in the embodiment described in FIG. 15, an extension of the first insulation layer 308 protects the ZTH defining insulation layer 316 and especially its front end 318 during processing steps, after which this layer is removed from the top surface of the ZTH defining insulation layer and the aforementioned gap layer 324 is formed.

Figure 21:
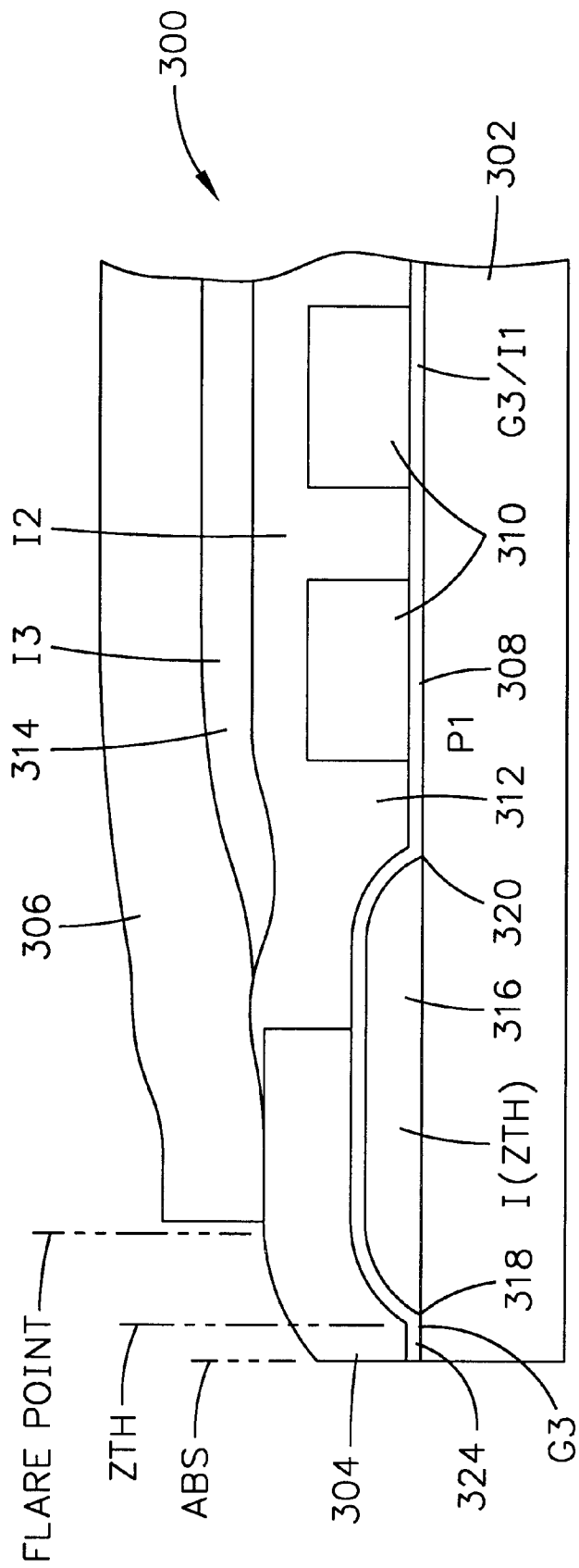
FIG. 21 is an enlarged front portion of the head, similar to FIG. 20, showing another embodiment of the gap layer.

Another embodiment of the gap layer is shown in FIG. 21, which is similar to the embodiment shown in FIG. 20. The write gap layer 324 and the first insulation layer 308 are a common layer which remains in place throughout the construction of the head. Accordingly, this layer is provided with an extra thickness so that the write gap layer 324 will have the proper thickness after processing steps before the second pole piece pole tip layer 304 is formed thereon. It should be noted, however, that this layer still protects the front end 318 of the ZTH defining insulation layer so as to prevent altering of the ZTH of the head.

Figure 23:
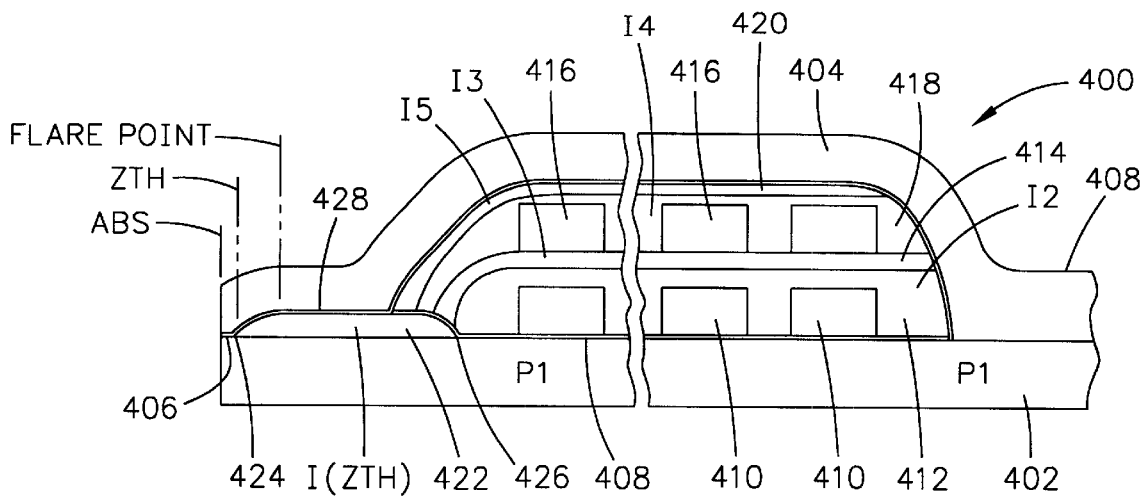
FIG. 23 is a longitudinal cross-sectional view of a single P2 layer double coil head employing the present invention.
Figure 24:
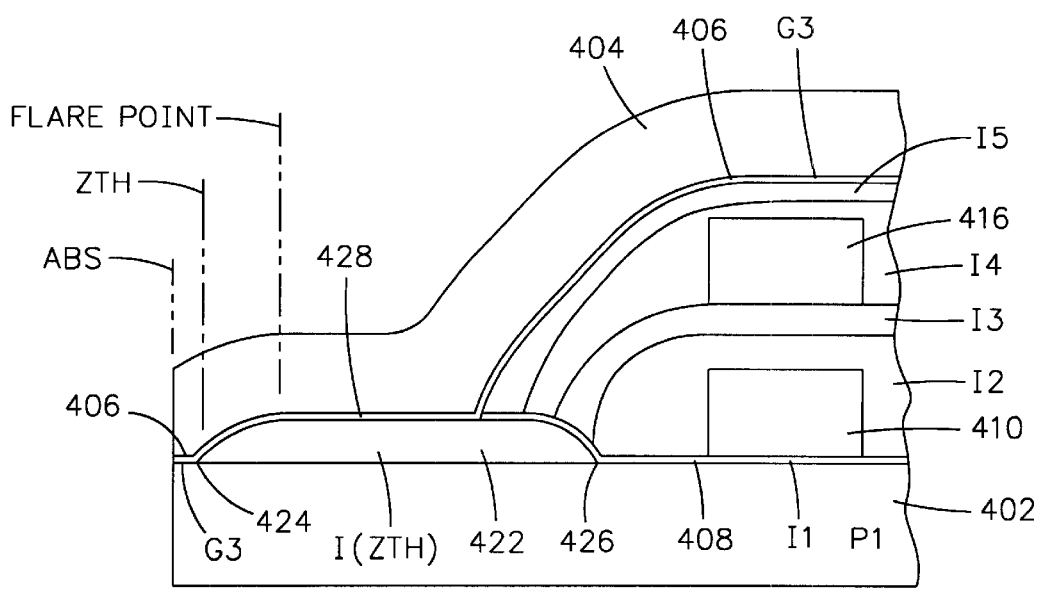
FIG. 24 is an enlarged front portion of FIG. 23 showing a first embodiment of the gap layer.
Figure 26:
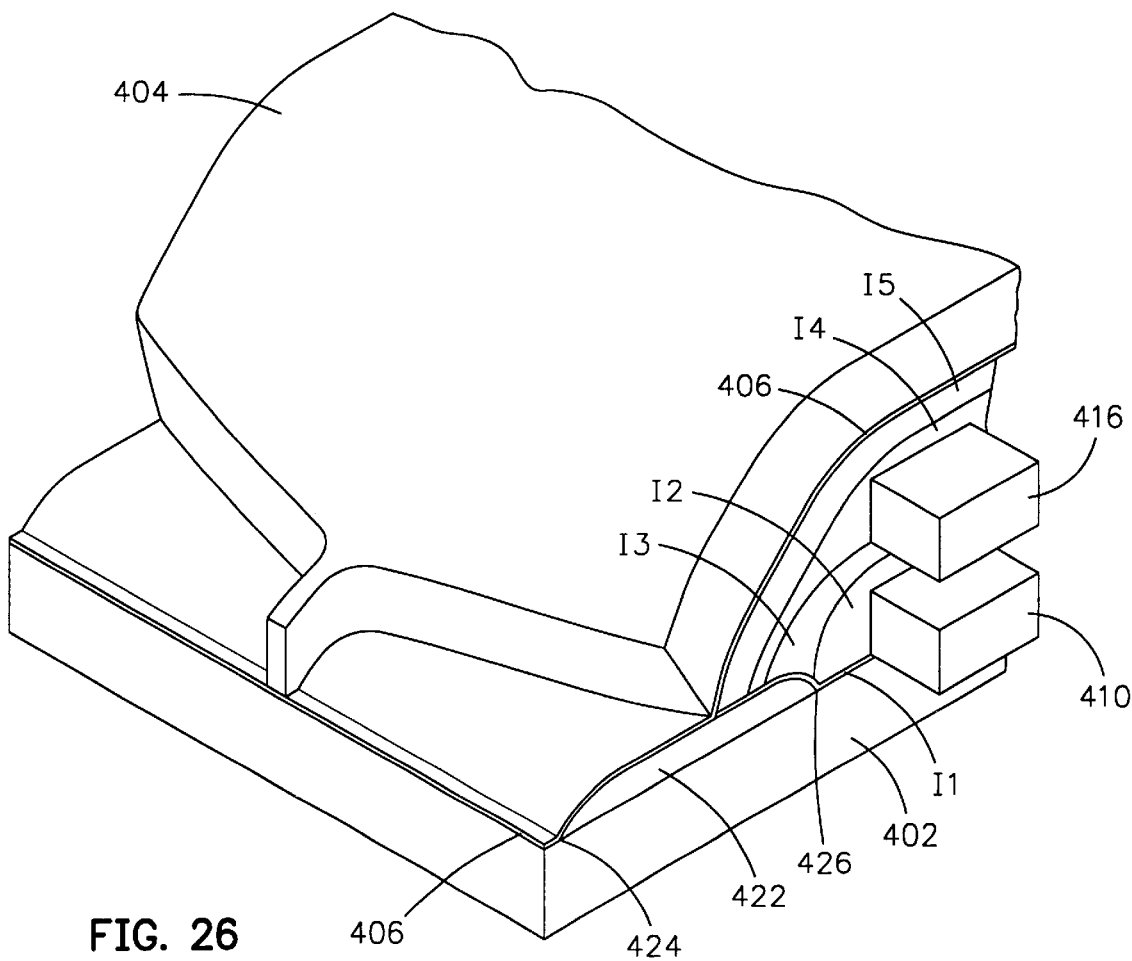
FIG. 26 is an isometric illustration of the head shown in FIG. 23.

FIGS. 23, 24 and 26 show a single P2 layer double coil inductive write head 400 which has a first pole piece layer 402 and a second pole piece layer 404 which are separated by a gap layer 406 at the ABS and connected at a back gap 408. As shown in FIG. 23, the head has an ABS, a ZTH and a flare point. The first and second pole piece layers 402 and 404 are separated by an insulation stack which includes a first insulation layer (I1) 408, a first coil layer 410 on the first insulation layer 408, a second insulation layer (I2) 412 on the coil layer 410, a third insulation layer (I3) 414 on the second insulation layer, a second coil layer 416 on the third insulation layer 414, a fourth insulation layer (I4) 418 on the coil layer 416 and a fifth insulation layer (I5) 420 on the fourth insulation layer. The head also has a ZTH defining insulation layer 422 which is located entirely between the ABS and the coil layer 410. The ZTH defining insulation layer has forward and rearward ends 424 and 426 with a substantially flat top surface 428 therebetween. The forward end 424 of the ZTH defining insulation layer defines the ZTH of the head.

FIG. 24 is an enlarged front portion of FIG. 23 showing a preferred gap layer arrangement wherein the gap layer 406 is not a common layer with the first insulation layer 408. While a forward extension of the first insulation layer 408 protected the front end 424 of the ZTH defining insulation layer during processing, this extension was removed and replaced by the gap layer 406 which was formed just prior to the formation of the second pole piece layer 404. As stated hereinabove, the gap layer 406 in the embodiment shown in FIG. 24 has a more accurately defined thickness with this arrangement.

Figure 25:
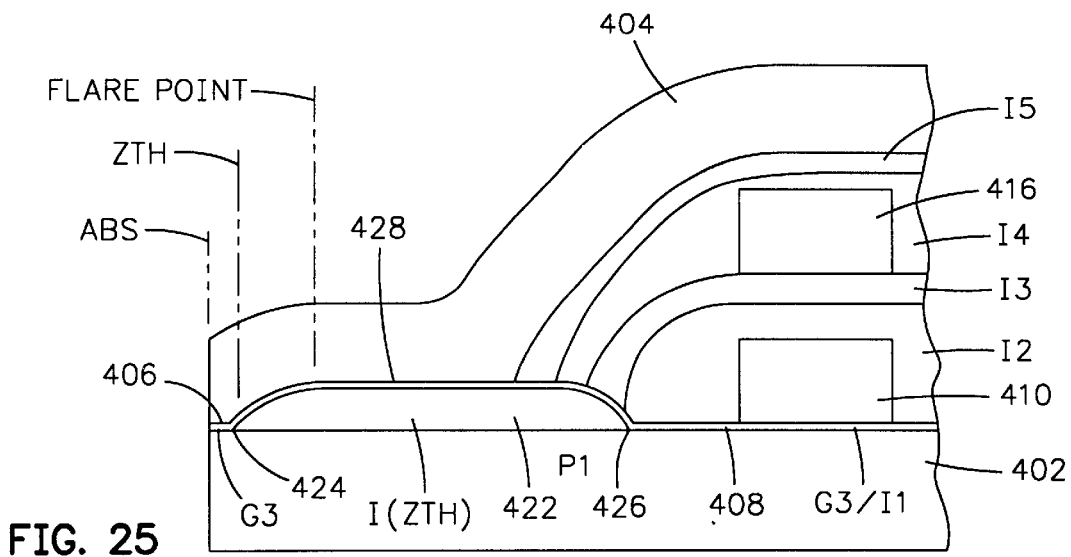
FIG. 25 is an enlarged front portion of the head, similar to FIG. 24, showing a second embodiment of the gap layer.

In FIG. 25 another embodiment of the gap layer is shown wherein the gap layer 406 and the first insulation layer 408 are a common layer. As stated hereinabove, the gap layer is provided with an extra thickness so as to be at a proper thickness after processing steps in constructing the coil layers 410 and 416.

Figure 27:
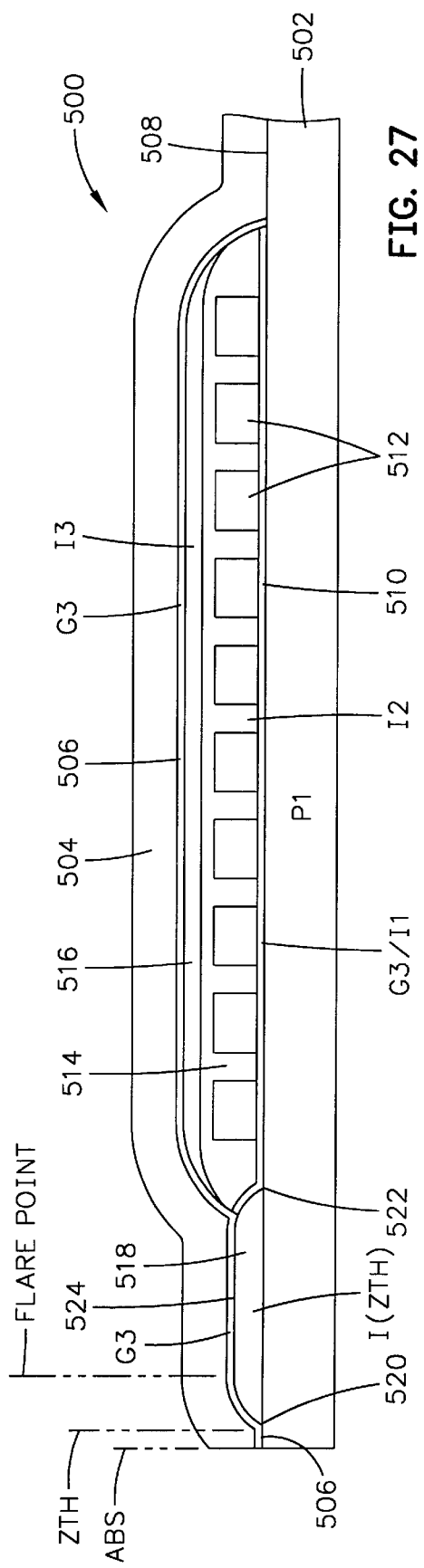
FIG. 27 is a longitudinal cross-sectional view of a single layer second pole piece single coil head employing the present invention.
Figure 28:
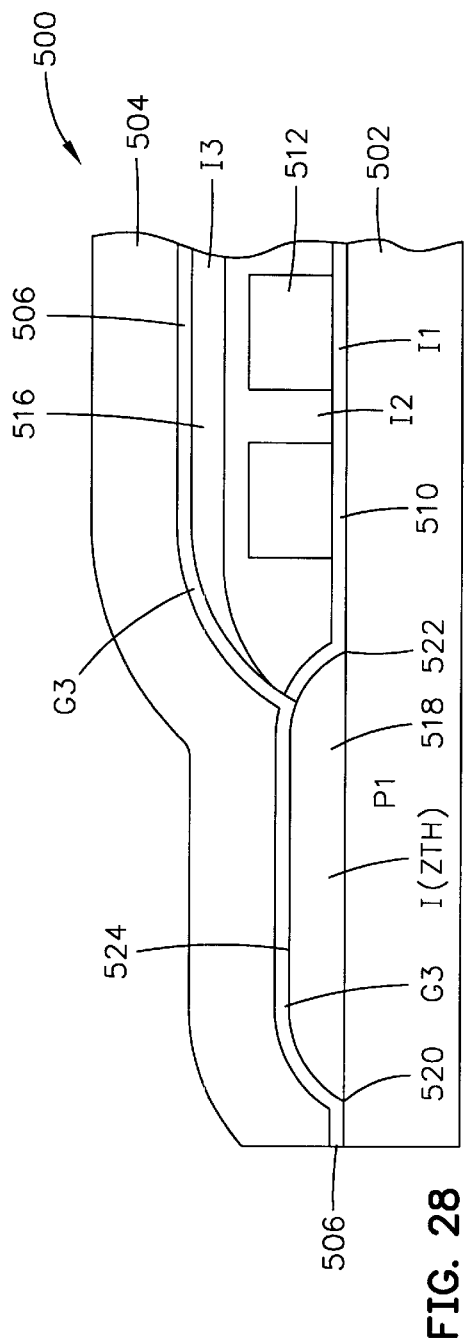
FIG. 28 is an enlarged front portion of FIG. 27 showing a first embodiment of the gap layer.
Figure 30:
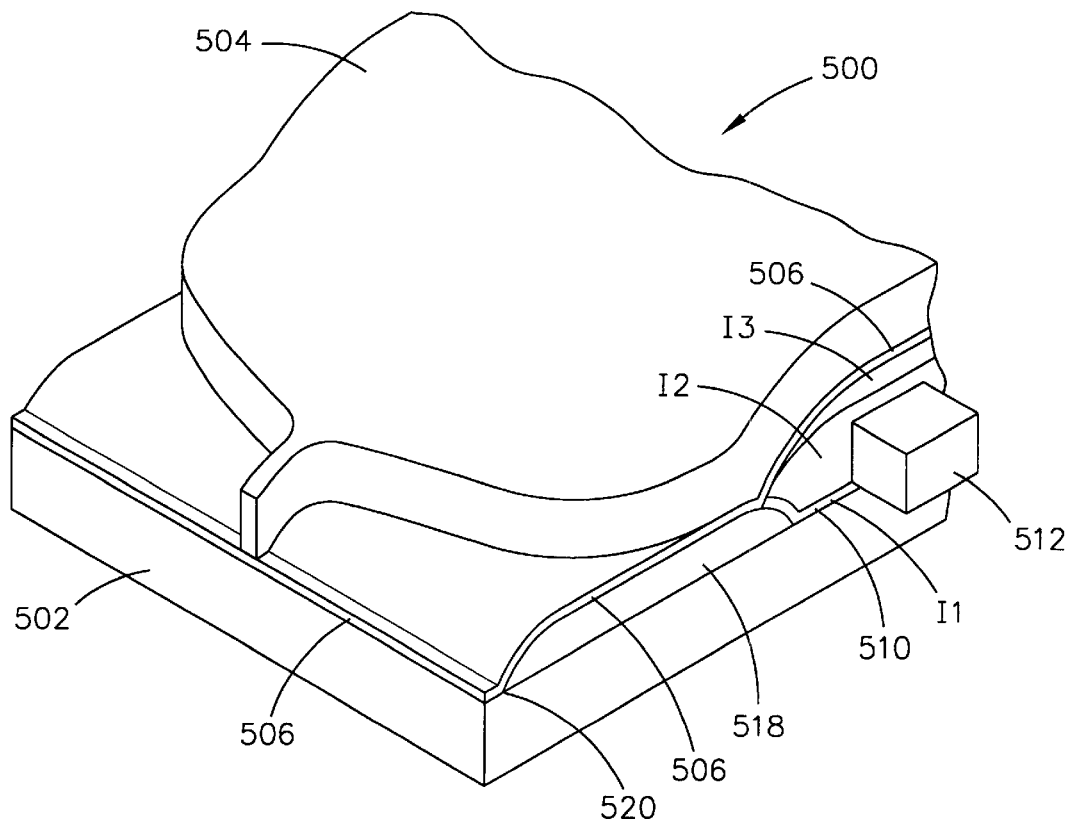
FIG. 30 is an isometric illustration of FIG. 27.

FIGS. 27, 28 and 30 show a single P2 layer single coil inductive write head 500 which includes a first pole piece layer 502 and a second pole piece layer 504 which are separated at the ABS by a gap layer 506 and are connected at a back gap 508. The first and second pole piece layers 502 and 504 are separated by an insulation stack which includes a first insulation layer (I1) 510, a first coil layer 512 on the first insulation layer, a second insulation layer (I2) 514 on the coil layer 512 and, optionally, a third insulation layer (I3) 516 on the second insulation layer. As shown in FIG. 27, the head has a ZTH and a flare point. The ZTH defining insulation layer 518 is located entirely between the ABS and the coil layer 512. A ZTH defining insulation layer 518 has forward and rear ends 520 and 522 and a substantially flat top surface 524 therebetween. The thickness of the ZTH defining insulation layer 518 is more than the thickness of the first insulation layer 510 so that the bottom surface of the coil is located below the top surface 524 of the ZTH defining insulation layer. This arrangement substantially lowers the insulation stack so that the pole tip portion of the second pole piece layer 504 can be more accurately defined during its frame plating.

FIG. 28 shows an enlarged front portion of the head shown in FIG. 27 wherein the gap layer 506 extends over the top surface 524 of the ZTH defining insulation layer, thence over the top surface of the third insulation layer (I3) 516. The gap layer 506 is a separate layer from the first insulation layer 510 and is formed just prior to formation of the second pole piece layer 504 so that it is not subjected to processing steps. Again, the first insulation layer 510 had a forward extension over the ZTH defining insulation layer during construction of the head for protecting the front end 520 so that the location of the ZTH is not changed during subsequent processing steps. The portion of the first insulation layer 510 that protected the ZTH defining insulation layer during construction was removed prior to the formation of the final gap layer 506.

Figure 29:
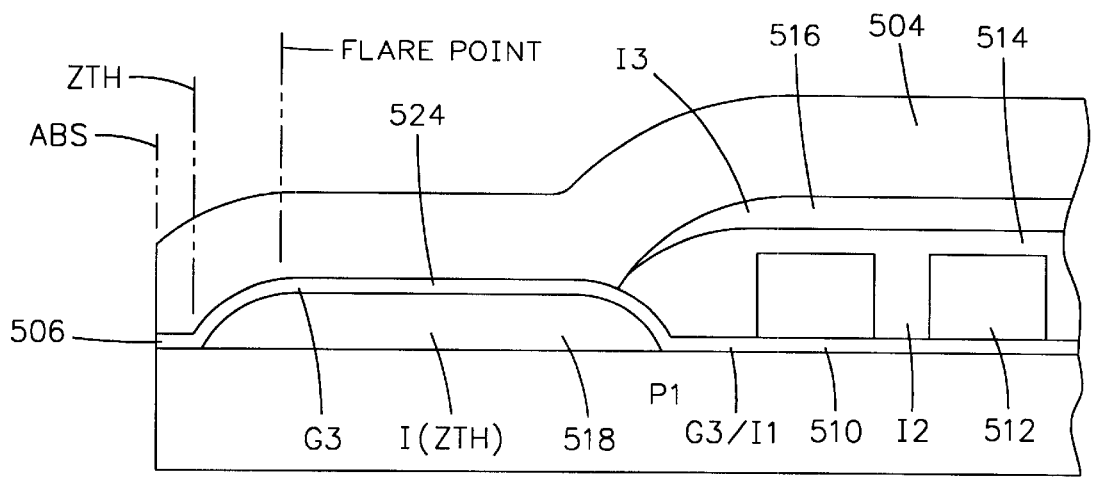
FIG. 29 is an enlarged front portion of the head, similar to FIG. 28, showing a second embodiment of the gap layer.

FIG. 29 is another embodiment of the gap layer wherein the gap layer 506 and the first insulation layer 510 are a common layer. As stated hereinabove, the gap layer is provided with an extra thickness so as to have the desired gap thickness after subsequent processing steps.

Method of Making

The method of making is shown in FIGS. 31–42. The various layers of the method of making are formed by sputter deposition or plating. Generally, the metallic layers are formed by plating and the non-conductive layers are formed by sputter deposition or forming hard baked photoresist. Sputter deposition is implemented in a vacuum chamber wherein a target of desired material is sputtered to a substrate via a plasma in the chamber because of an applied potential between the target and the substrate. Plating is a wet process wherein the wafer is placed in an electrolyte and a potential is applied between the surface to be plated and a plating material. Metallic ions from the plating material are then deposited on the desired surface. Masking is accomplished by photoresist masks which are spun onto the wafer, imaged with light and then portions to be removed are removed by a developer. Positive photoresist may be employed wherein the area of light imaging is removed by a developer to provide an opening for plating or a negative photoresist (cross-linked photoresist) may be employed where an area not imaged by light is removed by the developer to provide an opening for plating. After the desired layer is deposited the photoresist mask is then stripped by a dissolvent. Layer portions are removed by ion milling which, in essence, is particle bombardment of the layer with ions. It should be understood that these process steps are exemplary and there may be other steps well known in the art for forming the layers.

The first and second pole pieces are preferably Permalloy which is $Ni_{80}Fe_{20}$. If desired, a higher magnetic moment material may be employed for the second pole piece pole tip portion such as $Ni_{45}Fe_{55}$. The ZTH defining insulation layer is preferably photoresist and all of the insulation layers of the insulation stack are preferably photoresist, except the first insulation layer which is preferably alumina ($Al_2O_3$). After each photoresist layer is patterned it is hard baked, such as at a temperature of 200° C., which provides each layer with sloping surfaces at its edges. Optionally, the ZTH defining insulation layer, as well as the insulation layers of the insulation stack, may be another insulation material, such as alumina ($Al_2O_3$) or silicon dioxide ($SiO_2$). The write gap layer and the first insulation layer of the insulation stack are preferably alumina and are formed by sputtering. The pole piece layers are frame plated which comprises patterning with photoresist, plating into the opening in the photoresist and then removing the photoresist. If the pole piece layer is formed on a non-magnetic layer, such as alumina or baked photoresist, a seedlayer, such as copper or Permalloy, is sputtered on the layer to provide a return path for electroplating. A copper seedlayer is employed before the frame plating of a coil layer, after which the seedlayer is removed by ion milling without any patterning. Accordingly, the ion milling step for removing the seedlayer, after frame plating a coil layer, ion mills all of the surfaces of the wafer upon which rows and columns of heads are normally constructed. A metallic layer is normally constructed by frame plating. Frame plating comprises sputtering a seedlayer on the underlying layer if the underlying layer is electrically non-conductive, spinning a photoresist layer on the underlying layer, light imaging the photoresist layer in areas that are to be opened, developing the exposed regions of the photoresist to provide openings, or an opening, exposing the seedlayer where a metallic layer is to be plated, plating the metallic layer by electroplating, stripping the photoresist layer with a solvent and removing any seedlayer by ion milling.

Figure 31:
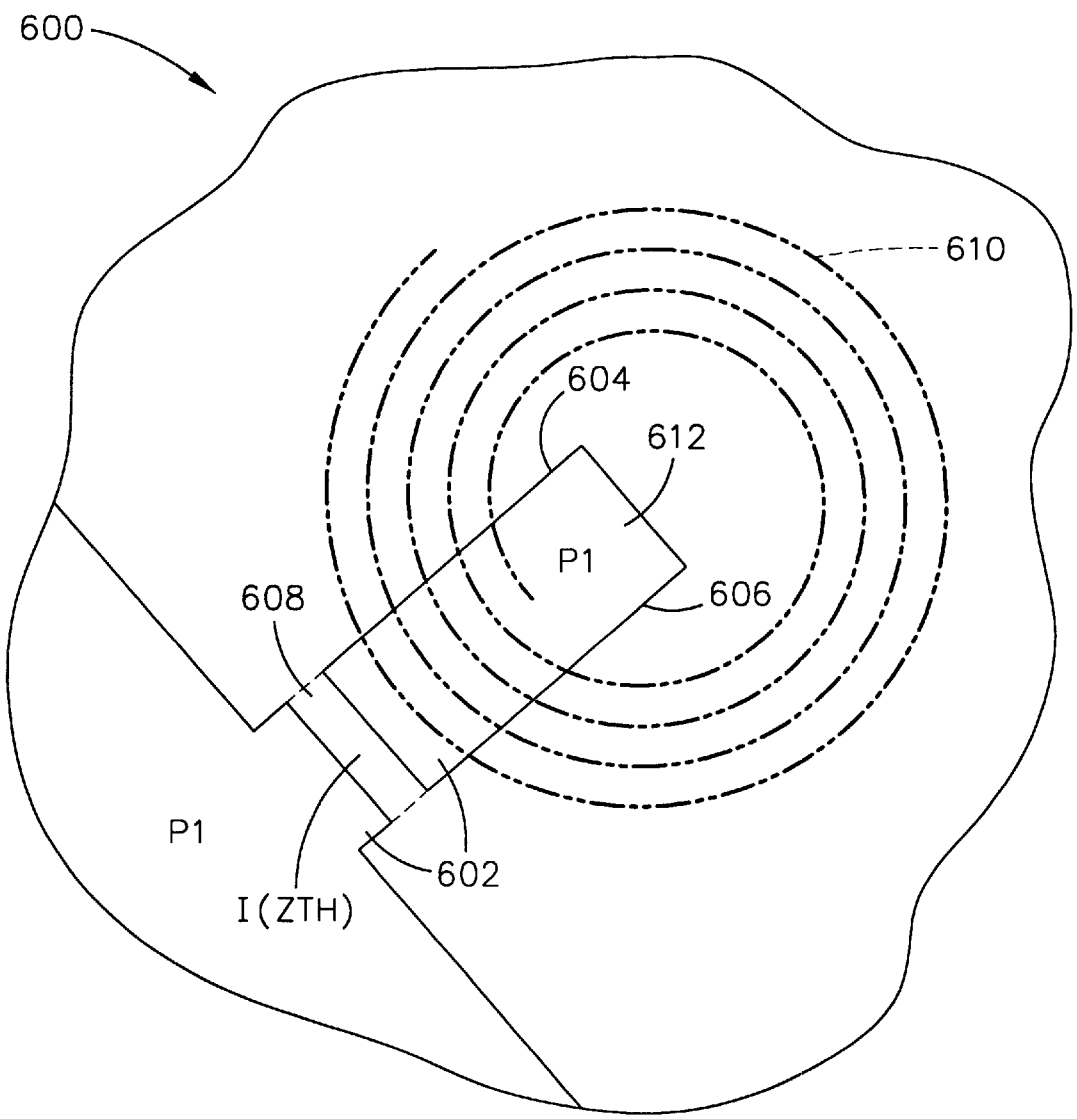
FIG. 31 is an isometric illustration of a zero throat height defining insulation layer being employed for reducing steps at the sides of a first pole piece layer for planarizing the head before construction of the first coil layer.

FIG. 31 is an isometric schematic illustration of a partially completed inductive magnetic head on a wafer 600, which may support hundreds of partially completed magnetic heads arranged in rows and columns as is well known in the art. The partially completed head includes a first pole piece layer 602 which has first and second side edges 604 and 606. A ZTH defining insulation layer is shown at 608. A coil layer 610 is shown in phantom surrounding a back gap region 612 of the first pole piece layer 602. It is important that the coil layer 610 be constructed on a flat substrate which is made impossible by the steps caused by the first and second side edges 604 and 606 of the first pole piece layer. Accordingly, it is desirable to extend the ZTH defining insulation layer beyond its primary location at 608 to locations adjacent the side edges 604 and 606 to minimize, or eliminate, the steps. With such a construction, frame plating of the coil layer 610 will provide the coil layer with more well-defined side walls.

Figure 32:
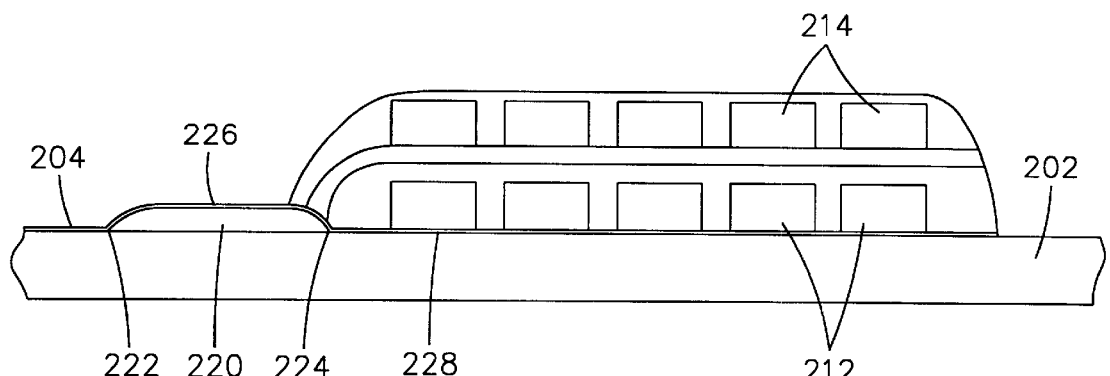
FIG. 32 shows a partial completion of the stitched double coil head shown in FIG. 15.
Figure 33:
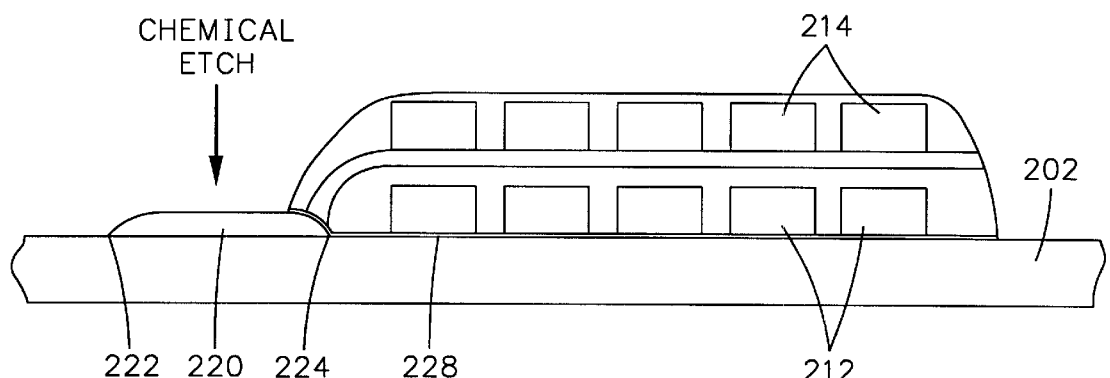
FIG. 33 is the same as FIG. 32 except a portion of the protective layer has been removed on top of the ZTH defining insulation layer.
Figure 34:
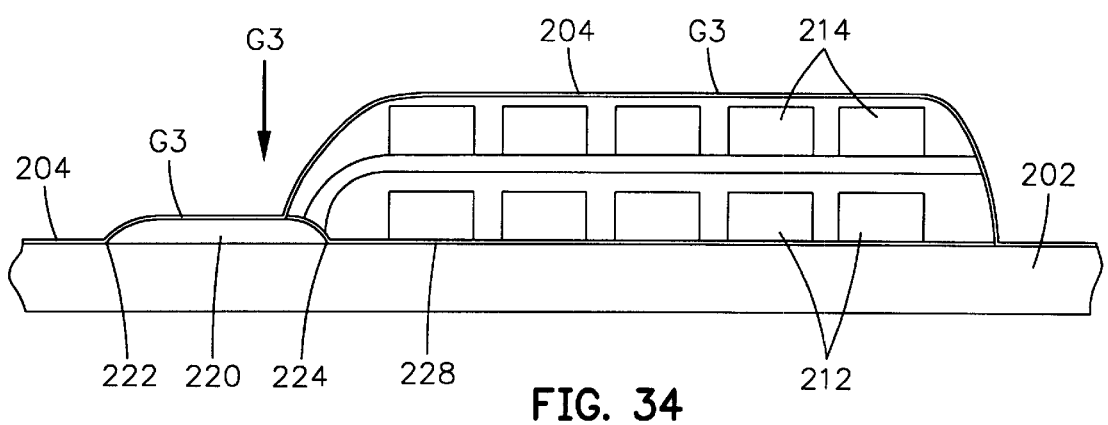
FIG. 34 is the same as FIG. 33 except a final gap layer has been deposited.

FIGS. 32–38 illustrate exemplary steps in the construction of the stitched double coil head shown in FIG. 15. In FIG. 32 the first pole piece layer 202 is constructed by frame plating. Next, the ZTH defining insulation layer 220 is constructed directly on the first pole piece layer 202 by patterned photoresist and then the photoresist layer is baked to provide the ZTH defining insulation layer 220 with front and rear sloping ends 222 and 224 and a flat top surface 226 therebetween. Next, the first insulation layer (I1) 228 is formed by sputter deposition on the top of the first pole piece layer 202 and on top of the ZTH defining insulation layer 220. Next, the insulation stack, including the first and second coil layers 212 and 214, are formed. The insulation layers of the stack, other than the first insulation layer 228, are formed by baked photoresist and the first and second coil layers 212 and 214 are formed by frame plating. As stated hereinabove, the last step of the frame plating involves removing a seedlayer for electroplating by ion milling, which also partially mills the forward extension of the first insulation layer 228 on the ZTH defining insulation layer 220, which protects the end 222 of the layer 220, as shown in FIG. 32. FIG. 33 shows a preferred embodiment in which the forward extension of the first insulation layer (I1) 228 is removed from the top of the ZTH defining insulation layer 220 and forward thereof by a suitable means, such as chemical etching. In FIG. 34, the final gap layer 204 is formed by sputter deposition which will have the exact gap thickness desired between the pole pieces at the ABS. In FIG. 34, the gap layer 204 and the first insulation layer (I1) 228 are now separate layers. As discussed hereinabove, the gap layer 204 and the first insulation layer (I1) 228 may be a common layer in which case it is provided with extra thickness so as to withstand the ion milling steps in removing seedlayers so as to have a final thickness that is a desired thickness for the gap at the ABS.

Figure 35:
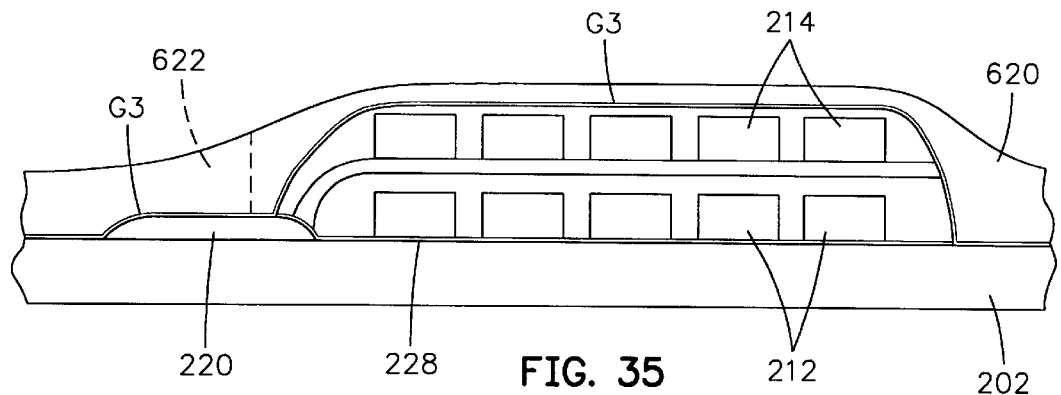
FIG. 35 is the same as FIG. 34 except a photoresist layer is being employed for constructing the pole tip portion of the second pole piece.
Figure 36:
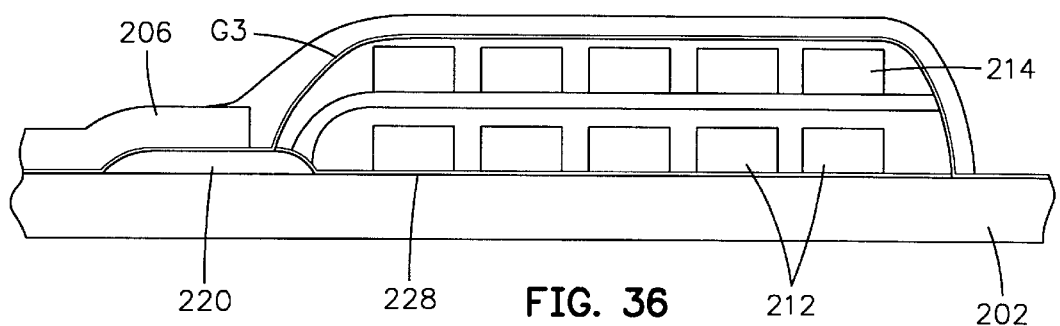
FIG. 36 is the same as FIG. 35 except the pole tip portion of the second pole piece has been formed.
Figure 37:
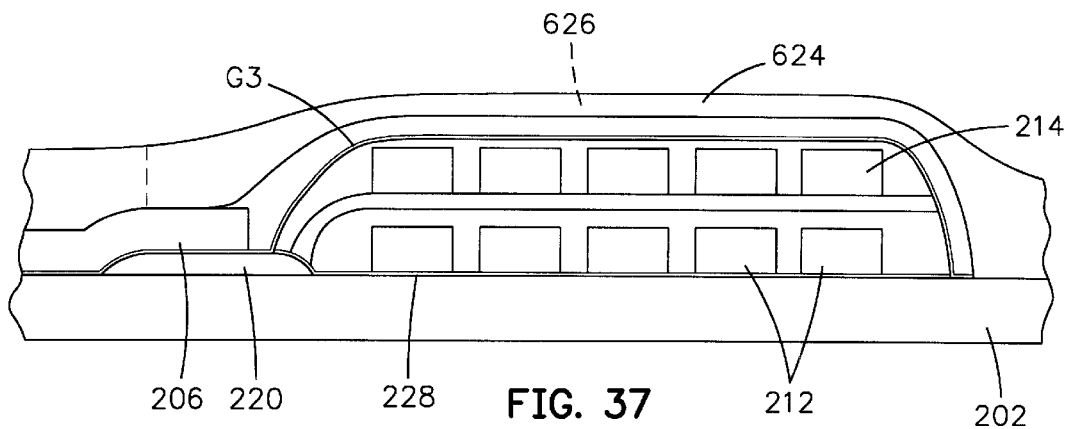
FIG. 37 is the same as FIG. 36 except photoresist is being employed for constructing the yoke portion of the second pole piece.
Figure 38:
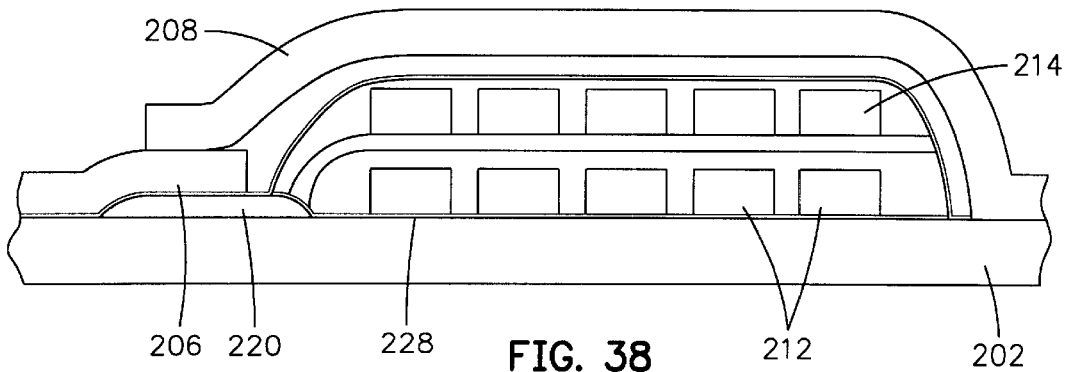
FIG. 38 is the same as FIG. 37 except the yoke portion of the second pole piece has been formed.

FIG. 35 shows a frame plating step wherein a photoresist pattern 620 is being employed for constructing a second pole piece pole tip portion in the region 622. FIG. 36 shows the partially completed head after removal of the photoresist layer 620 and plating of the second pole piece pole tip portion 206. FIG. 37 shows a photoresist layer 624 for the construction of the second pole piece yoke portion in region 626. FIG. 38 shows the head after removal of the photoresist layer 624 and after the plating of the second pole piece yoke layer 208.

Figure 39:
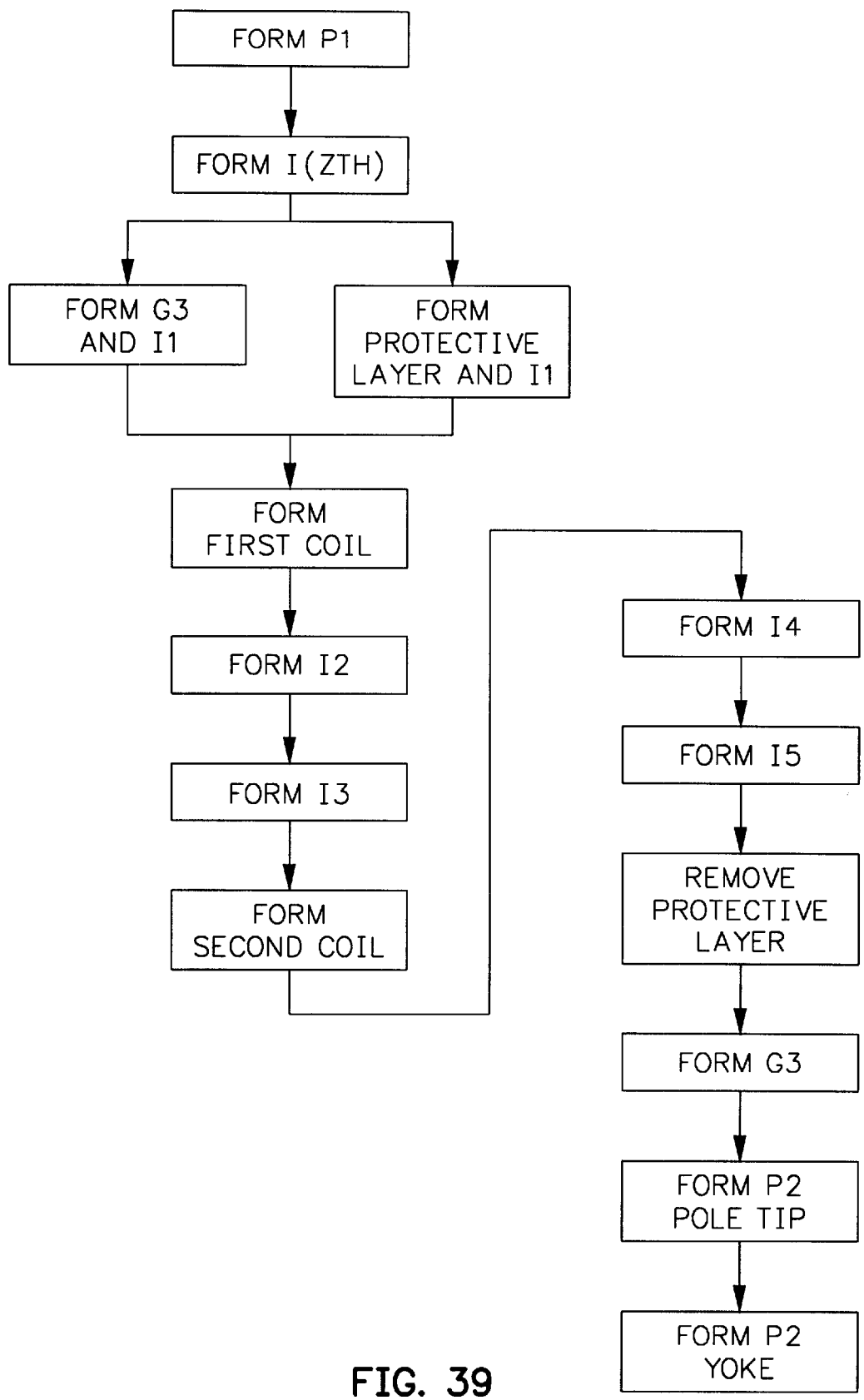
FIG. 39 is a series of steps for constructing the head shown in FIG. 15.

The methods of making of the heads shown in FIGS. 15, 19, 23 and 27 are illustrated in FIGS. 39, 40, 41 and 42, respectively. FIG. 39 shows methods for constructing the head shown in FIG. 15. In reference to FIGS. 15 and 39, the first pole piece layer 202 is constructed and the ZTH defining insulation layer 220 is constructed thereon. After constructing the ZTH defining insulation layer 220, a decision is made as to whether to deposit an extra thick layer which comprises the gap layer 204 and the first insulation layer 228, or deposit a common layer, which provides the first insulation layer 228 and a protective layer over the ZTH defining insulation layer 220 to protect the front end 222 which defines the ZTH. In any event, this layer is preferably an alumina layer. Next, the first coil layer 212 is formed by frame plating, followed by hard baked second and third insulation layers 230 and 232. Next, the second coil layer 214 is formed by frame plating followed by fourth and fifth baked photoresist layers 234 and 236. Some of the insulation layers should cover a rear end portion of the ZTH defining insulation layer 220 and at least the last insulation layer 236 should cover a rear portion of the second pole piece pole tip 206. As stated hereinabove, in some embodiments the third and fifth insulation layers 232 and 236 may be omitted so as to reduce the stack height still further. If the first insulation layer 228 was providing protection only for the ZTH defining insulation layer 223, it is then removed by chemical etching and the final gap layer 204 is deposited to the correct thickness. The second pole piece pole tip layer 206 is then formed by frame plating, which will have improved side wall definition because of the lower insulation stack. The second pole piece yoke layer 208 is then formed on top of the insulation stack making connection at the back gap and stitched to the second pole piece pole tip layer 206.

Figure 40:
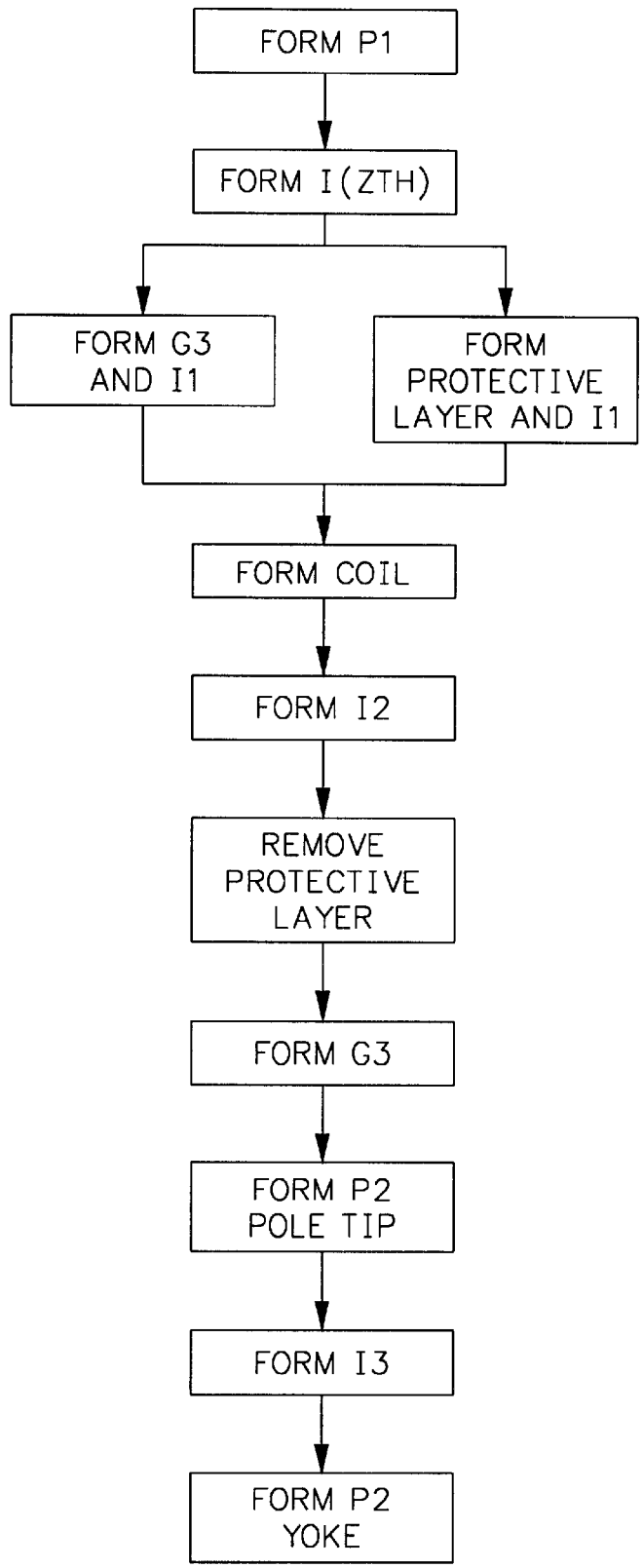
FIG. 40 is a series of steps for constructing the head shown in FIG. 19.

FIG. 40 shows methods for constructing the head shown in FIG. 19. In reference to FIGS. 19 and 40, a first pole piece layer 302 is constructed by frame plating followed by constructing a hard baked photoresist ZTH defining layer 316 with a forward end 318 located at the desired ZTH. Next, a decision is made as in the previous method as to whether to form an extra thick gap layer to survive the processing steps or a first insulation layer that provides protection for the front end 318 of the ZTH defining insulation layer so that the ZTH is not altered. Next, a coil layer 310 is constructed on the first insulation layer 308 followed by a second insulation layer 312 on the coil layer. If the first insulation layer was serving as a protection layer for the front end 318 of the ZTH defining insulation layer, then it is removed by chemical etching and the final gap layer 324 is formed which extends from the ABS over the top portion of the ZTH defining insulation layer, thence over the top surface of the second insulation layer 312. The second pole piece pole tip layer 304 is then formed by frame plating followed by formation of the third insulation layer 314 so as to cover a rear portion of the second pole piece pole tip layer 304. Finally, the second pole piece yoke layer 306 is formed to cover the insulation stack making connection with the second pole piece pole tip layer 304 and connection with the first pole piece layer 302 at the back gap.

Figure 41:
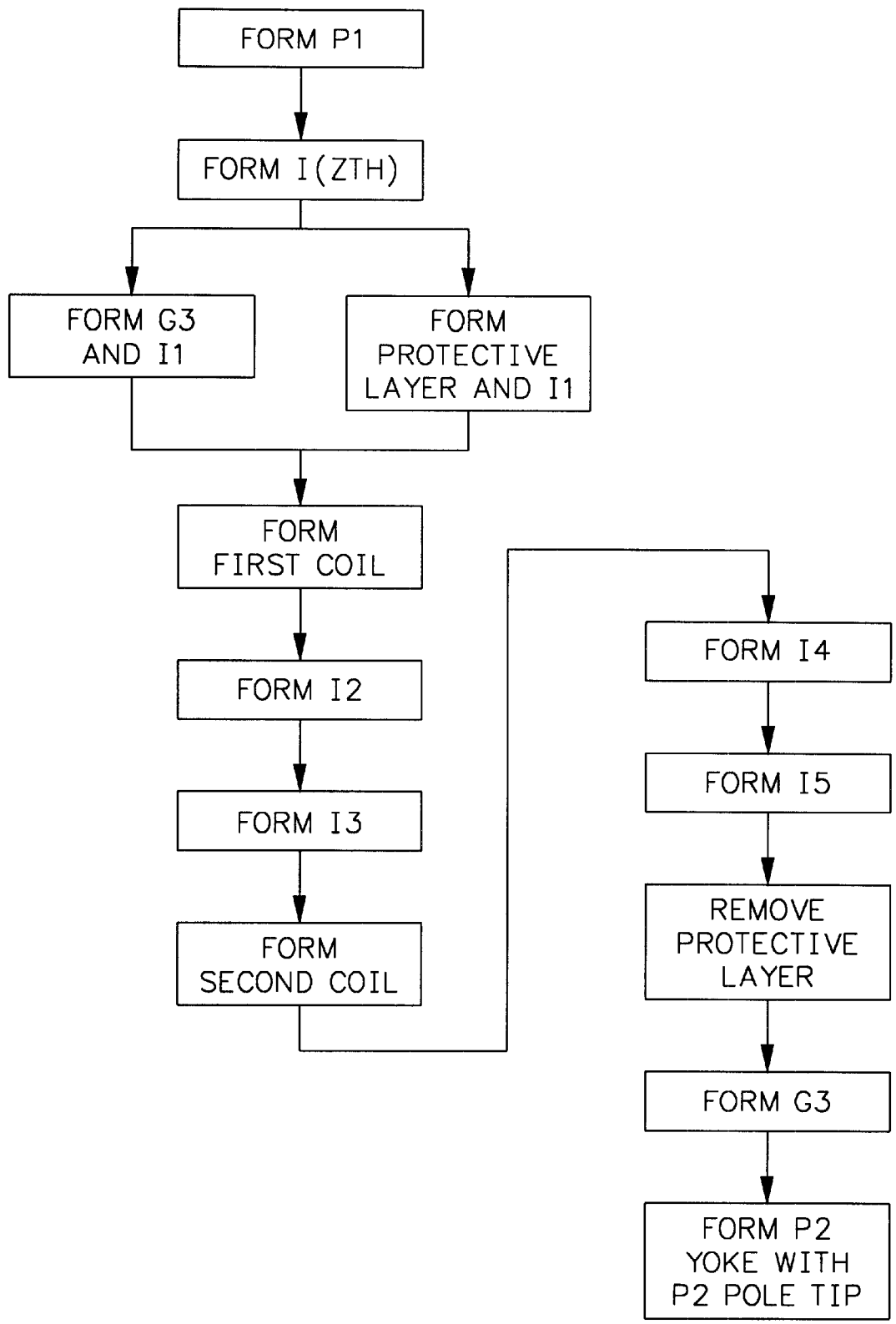
FIG. 41 illustrates a series of steps for constructing the head shown in FIG. 23.

FIG. 41 shows methods for making the head shown in FIG. 23. After forming the first pole piece layer 402 the ZTH defining insulation layer 422 is formed on the first pole piece layer 402 with a first end 424 at the location of the ZTH. Next, a decision is made whether to make an extra thick common layer comprising the gap layer 406 and the first insulation layer 408, or whether to employ the insulation layer 408 as a protective covering of the ZTH defining insulation layer 422 to protect the front end 424 from processing steps. Next, the first coil layer 410 is formed on the first insulation layer followed by the formation of second and third insulation layers 412 and 414. Next, the second coil layer 416 is formed followed by the formation of the fourth and fifth insulation layers 418 and 420. If the insulation layer 408 serves as a protective layer for the ZTH defining insulation layer 422, it is removed therefrom by chemical etching and the final gap layer 406 is formed followed by formation of the second pole piece layer 404.

Figure 42:
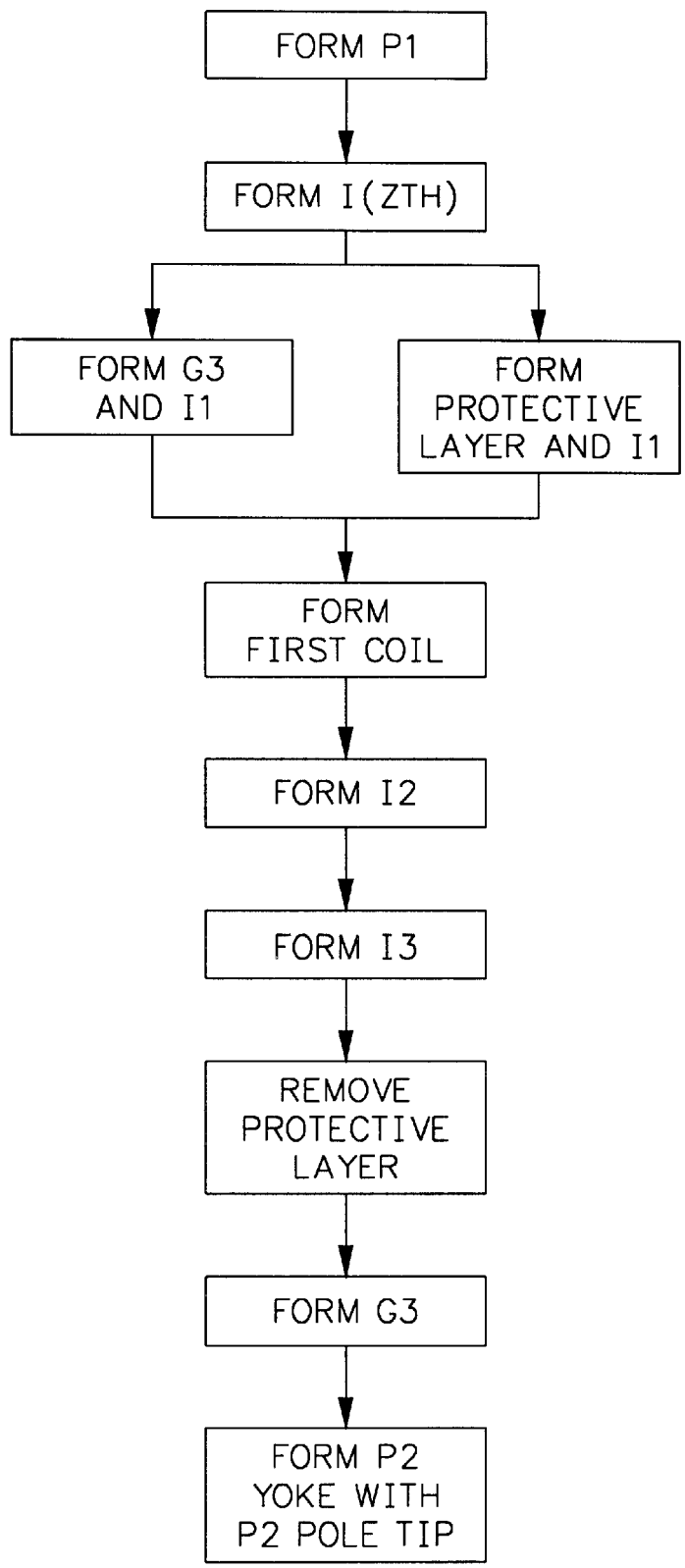
FIG. 42 illustrates a series of steps for constructing the head shown in FIG. 27.

The construction of the write head shown in FIG. 27 is shown in FIG. 42. With reference to FIGS. 27 and 42, the first pole piece layer 502 is frame plated followed by formation of the ZTH defining insulation layer 518 with a front end 520 that defines the zero throat height of the head. Next, a decision is made as to whether to make an extra thick common layer comprising the gap layer 506 and the first insulation layer 510 or to employ the first insulation layer 510 as a protective layer to protect the front end 520 of the ZTH defining insulation layer from subsequent processing steps. Next, the coil layer 512 is formed on the first insulation layer followed by the second and third insulation layers 514 and 516. If the first insulation layer 510 is employed for protecting the front end 520 of the ZTH defining insulation layer, it is removed by chemical etching and the final gap layer 506 is deposited. This is followed by formation of the second pole piece layer 504.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic head that has a zero throat height (ZTH) where a first pole piece layer and a second pole piece first separate from one another after an air bearing surface (ABS) in a direction from the ABS toward a back gap, comprising:

forming the first pole piece layer;

forming the ZTH defining insulation layer on a first portion of the first pole piece layer;

forming an insulation layer on the ZTH defining insulation layer and a first insulation layer on a second portion of the first pole piece layer;

forming a coil layer on the first insulation layer;

the ZTH defining insulation layer being located entirely between the coil layer and the ABS;

forming at least a second insulation layer on the coil layer;

forming the second pole piece over a front portion of a top surface of the ZTH defining insulation layer and on the second insulation layer, the ZTH defining insulation layer causing the second pole piece to separate from the first pole piece layer; and the step of forming the ZTH defining insulation layer providing the ZTH defining insulation layer with a thickness that positions a bottom surface of the coil layer closer with respect to a top surface of the first pole piece layer than the top surface of the ZTH defining insulation layer is with respect to the top surface of the first pole piece layer.

2. The method as claimed in claim 1 wherein said insulation layer is a write gap layer which is a common layer with said first insulation layer.

3. The method as claimed in claim 1 further including:

after forming the coil layer, removing said insulation layer and forming a write gap layer on the ZTH defining insulation layer.

4. The method as claimed in claim 1 including:

forming the ZTH defining insulation layer thicker than the first insulation layer.

5. The method as claimed in claim 4 including:

forming the ZTH defining insulation layer with first and second surfaces wherein the second surface has first and second portions with the first portion closer to the ABS than the second portion;

forming the insulation stack with at least one insulation layer other than the first insulation layer over the second portion of the second surface of the ZTH defining insulation layer; and the second pole piece being over the first portion of the second surface of the ZTH defining insulation layer.

6. The method as claimed in claim 5 including:

forming the head with a flare point where the second pole piece first commences to widen after the ABS;

forming at least a portion of the second surface of the ZTH defining insulation layer flat; and forming the flare point on the flat portion of the ZTH defining insulation layer.

7. The method as claimed in claim 5 further including:

forming the second pole piece with a pole tip layer and a yoke layer wherein the pole tip layer is located entirely between the ABS and the coil layer and the yoke layer extends from a location between the ABS and the coil layer to the back gap;

forming each of the pole tip layer and the yoke layer with first and second surfaces, the second surface of the pole tip layer having first and second portions wherein the first portion is closer to the ABS than the second portion; and forming the insulation stack with at least one other insulation layer, other than the first insulation layer, on the second portion of the second surface of the pole tip layer and the yoke layer on the first portion of the second surface of the pole tip layer.

8. The method as claimed in claim 7 including:

forming a third insulation layer on the second insulation layer;

forming a second coil layer on the third insulation layer;

forming a fourth insulation layer on the second coil layer and a fifth insulation layer on the fourth insulation layer; and the forming of said at least one insulation layer over the second portion of the second surface of the ZTH defining insulation layer being formed by forming said third insulation layer and the forming of said at least one insulation layer on the second portion of the second surface of the second pole tip layer being formed by forming said fifth insulation layer.

9. The method as claimed in claim 8 including:

forming the head with a flare point where the second pole piece first commences to widen after the ABS;

forming at least a portion of the second surface of the ZTH defining insulation layer flat; and forming the flare point on the flat portion of the ZTH defining insulation layer.

10. The method as claimed in claim 9 wherein said insulation layer is a write gap layer which is a common layer with said first insulation layer.

11. The method as claimed in claim 9 further including:

after forming the coil layer, removing said insulation layer and forming a write gap layer on the ZTH defining insulation layer and on the fourth insulation layer.

12. The method as claimed in claim 7 including:

forming only one coil layer in the magnetic head; and the forming of said at least one insulation layer over the second portion of the second surface of the ZTH defining insulation layer and the forming said at least one insulation layer on the second portion of the second surface of the second pole tip layer being formed by forming said second insulation layer of the insulation stack.

13. The method as claimed in claim 12 including:

forming the head with a flare point where the second pole piece first commences to widen after the ABS;

forming at least a portion of the second surface of the ZTH defining insulation layer flat; and forming the flare point on the flat portion of the ZTH defining insulation layer.

14. The method as claimed in claim 13 wherein said insulation layer is a write gap layer which is a common layer with said first insulation layer.

15. The method as claimed in claim 13 further including:

after forming the coil layer, removing said insulation layer and forming a write gap layer on the ZTH defining insulation layer and on the second insulation layer.

16. The method as claimed in claim 5 including:

forming the second pole piece of a single second pole piece layer.

17. The method as claimed in claim 16 including:

forming another coil layer on the second insulation layer;

forming a further insulation layer on the second coil layer; and the forming of said at least one other insulation layer over the second portion of the second surface of the ZTH defining insulation layer being formed by forming said further insulation layer.

18. The method as claimed in claim 17 including:

forming the -head with a flare point where the second pole piece first commences to widen after the ABS;

forming at least a portion of the second surface of the ZTH defining insulation layer flat; and forming the flare point on the flat portion of the ZTH defining insulation layer.

19. The method as claimed in claim 18 wherein said insulation layer is a write gap layer which is a common layer with said first insulation layer.

20. The method as claimed in claim 18 further including:

after forming the coil layer, removing said insulation layer and forming a write gap layer on the ZTH defining insulation layer and on said further insulation layer.

21. The method as claimed in claim 16 wherein only one coil layer is formed and the forming of said at least one other insulation layer over the second portion of the second surface of the ZTH defining insulation layer is formed by forming the second insulation layer.

22. The method as claimed in claim 21 including:

forming the head with a flare point where the second pole piece first commences to widen after the ABS;

forming at least a portion of the second surface of the ZTH defining insulation layer flat; and forming the flare point on the flat portion of the ZTH defining insulation layer.

23. The method as claimed in claim 22 wherein said insulation layer is a write gap layer which is a common layer with said first insulation layer.

24. The method as claimed in claim 22 further including:

after forming the coil layer, removing said insulation layer and forming a write gap layer on the ZTH defining insulation layer and on the second insulation layer.

* * * * *